(12) United States Patent
Lin et al.

(10) Patent No.: US 12,504,605 B2
(45) Date of Patent: Dec. 23, 2025

(54) LENS SYSTEM, PROJECTION APPARATUS, DETECTING MODULE AND ELECTRONIC DEVICE

(71) Applicant: LARGAN PRECISION CO., LTD., Taichung (TW)

(72) Inventors: Yu-Jui Lin, Taichung (TW); Hsin-Hsuan Huang, Taichung (TW)

(73) Assignee: LARGAN PRECISION CO., LTD., Taichung (TW)

( * ) Notice: Subject to any disclaimer, the term of this patent is extended or adjusted under 35 U.S.C. 154(b) by 21 days.

(21) Appl. No.: 17/740,442

(22) Filed: May 10, 2022

(65) Prior Publication Data
US 2022/0269049 A1 Aug. 25, 2022

Related U.S. Application Data

(63) Continuation of application No. 16/401,299, filed on May 2, 2019, now Pat. No. 11,360,290.

(30) Foreign Application Priority Data

Nov. 27, 2018 (TW) ................. 107142271

(51) Int. Cl.
  *G02B 13/00* (2006.01)
  *G02B 9/16* (2006.01)
  *G03B 21/20* (2006.01)
(52) U.S. Cl.
  CPC ........... *G02B 13/0035* (2013.01); *G02B 9/16* (2013.01); *G03B 21/2033* (2013.01)
(58) Field of Classification Search
  CPC .. G02B 13/00; G02B 13/0035; G02B 13/008; G02B 13/04; G02B 13/18; G02B 13/16; G02B 3/02; G02B 3/04; G02B 9/14; G02B 9/16; G02B 9/12; G02B 7/02; G02B 7/028; G02B 27/0025; G02B 27/42; G02B 27/4205; G02B 15/177; G03B 21/20; G03B 21/14; G03B 21/145; G03B 21/2033; G03B 21/147; G03B 21/142
  USPC ........ 359/690, 698, 716, 748, 708, 784, 785
  See application file for complete search history.

(56) References Cited

U.S. PATENT DOCUMENTS

| 2,270,234 | A | | 1/1942 | Warmisham |
| 2,298,090 | A | | 10/1942 | Warmisham |
| 3,838,910 | A | | 10/1974 | Ruben |
| 5,596,455 | A | * | 1/1997 | Eckhardt .................. G02B 9/16 359/785 |
| 8,462,449 | B2 | | 6/2013 | Hsu et al. |

(Continued)

FOREIGN PATENT DOCUMENTS

| CN | 105467562 A | 4/2016 |
| CN | 106569318 A | 4/2017 |

(Continued)

*Primary Examiner* — Jie Lei
(74) *Attorney, Agent, or Firm* — Troutman Pepper Locke LLP; Tim Tingkang Xia, Esq.

(57) ABSTRACT

An electronic device includes a lens system. The lens system includes three lens elements, which are, in order from an outer side to an inner side: a first lens element, a second lens element and a third lens element. The first lens element with positive refractive power has an outer-side surface being convex in a paraxial region thereof. The second lens element has negative refractive power. The third lens element has positive refractive power.

16 Claims, 20 Drawing Sheets

(56) References Cited

U.S. PATENT DOCUMENTS

| | | |
|---|---|---|
| 10,031,317 B2 | 7/2018 | Hsueh et al. |
| 11,009,679 B2 * | 5/2021 | Tsai .................... G02B 13/008 |
| 2015/0212289 A1 | 7/2015 | Matsuo |
| 2016/0116713 A1 | 4/2016 | Hsu et al. |
| 2016/0227082 A1 * | 8/2016 | Hsueh ................ G02B 13/0035 |
| 2017/0139184 A1 | 5/2017 | Bae |
| 2017/0224201 A1 | 8/2017 | Yamamoto |
| 2019/0137733 A1 | 5/2019 | Gong et al. |
| 2019/0154976 A1 * | 5/2019 | Tsai .................... G02B 13/0035 |
| 2019/0154977 A1 | 5/2019 | Tsai et al. |
| 2019/0171000 A1 | 6/2019 | Takumi |
| 2019/0179116 A1 | 6/2019 | Huang et al. |
| 2020/0033568 A1 | 1/2020 | Liu |
| 2020/0041771 A1 | 2/2020 | Peng et al. |
| 2020/0124825 A1 | 4/2020 | Liu et al. |
| 2020/0142162 A1 | 5/2020 | Huang |
| 2020/0400928 A1 | 12/2020 | Wang et al. |

FOREIGN PATENT DOCUMENTS

| | | |
|---|---|---|
| CN | 108107548 A | 6/2018 |
| CN | 109782421 A | 5/2019 |
| CN | 208847938 U | 5/2019 |
| JP | 2007279547 A | 10/2007 |
| JP | 2007279548 A | 10/2007 |
| JP | 2017142295 A | 8/2017 |
| JP | 2017207658 A | 11/2017 |
| TW | 1631367 B | 8/2018 |
| TW | 201917441 A | 5/2019 |
| TW | 1672539 B | 9/2019 |
| TW | 1687732 B | 3/2020 |

\* cited by examiner

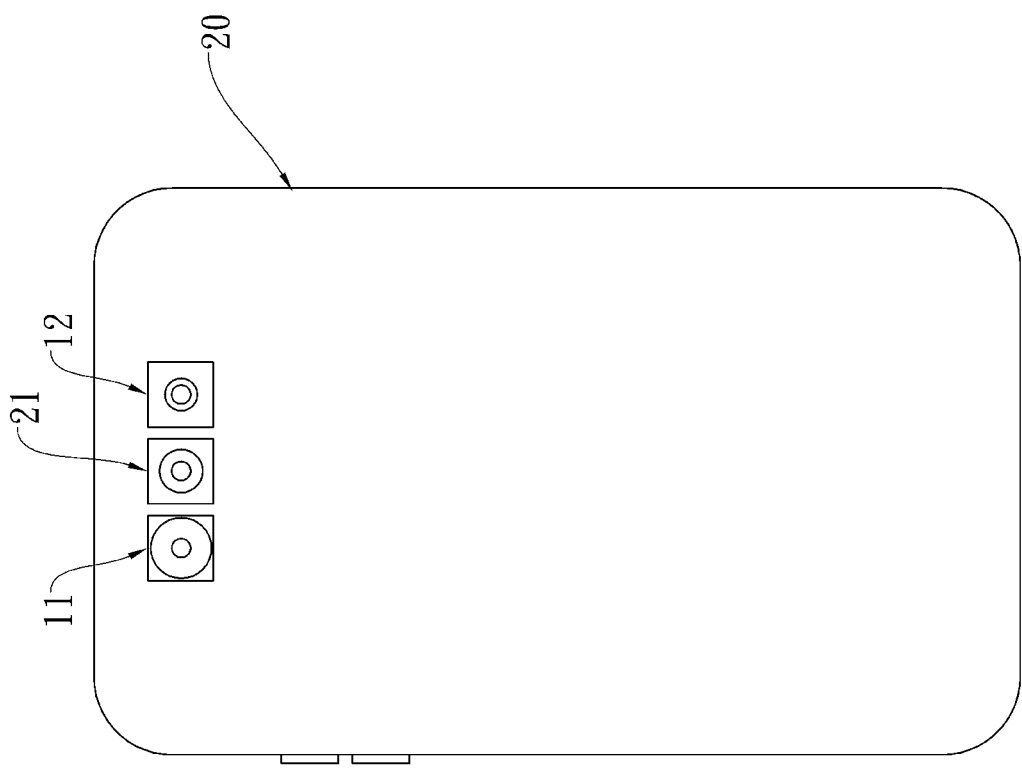

ND ELECTRONIC
LENS SYSTEM, PROJECTION APPARATUS, DETECTING MODULE AND ELECTRONIC DEVICE

RELATED APPLICATIONS

This application is a continuation application of U.S. application Ser. No. 16/401,299 filed on May 2, 2019, now approved and claims priority to Taiwan Application Serial Number 107142271, filed on Nov. 27, 2018, which is incorporated by reference herein in its entirety.

BACKGROUND

Technical Field

The present disclosure relates to a lens system and a projection apparatus, and more particularly, to a lens system, a projection apparatus and a detecting module applicable to electronic devices.

Description of Related Art

With increasing applications of photographic modules, lens specifications by popular demand are becoming more diverse. A lens unit capable of collecting 3-dimensional information can add depth of field information to two-dimensional images, providing better user experiences with higher accuracy and reality. Further, with appropriate optics and imaging technologies, speed and resolutions of 3-dimensional detection are improved, and such lens units are applicable to 3-dimensional imaging such as augmented realities, face recognitions, iris recognitions, gesture recognitions and 3-dimensional modeling.

In the past, the development of human-computer interaction or imaging devices on the market was mostly limited in two-dimensional space. However, a significant gap still exists between the two-dimensional images and the real images seen by naked eyes. In order to provide a higher level of immersion in electronic devices, or to enhance the convenience of life, the technology for capturing and applying the 3-dimensional information becomes an important part in the technological developments of the future. With light which projects specific patterns onto an detected object, retrieving the light reflected from different depth positions on the detected object by another lens unit, and calculating the changes in properties of the reflected light, a distance between the lens units and the positions of interest on the detected object can be obtained as well as the 3-dimensional structure of the detected object or the motion signals of the detected object can be identified thereby for completing further specific operations or instructions. Currently, various applications on retrieving and interacting with the 3-dimensional image information are available on the market, including face recognition systems, somatosensory game consoles, augmented reality devices, driving assistance systems, various smart electronics, multi-lens devices, wearable devices, digital cameras, recognition systems, entertainment devices, sport devices, smart home systems and other electronics.

SUMMARY

According to one aspect of the present disclosure, an electronic device includes a lens system, the lens system including three lens elements, which are, in order from an outer side to an inner side: a first lens element, a second lens element and a third lens element, wherein the first lens element with positive refractive power has an outer-side surface being convex in a paraxial region thereof, the second lens element has negative refractive power, the third lens element has positive refractive power, a curvature radius of the outer-side surface of the first lens element is R1, a curvature radius of an inner-side surface of the third lens element is R6, an axial distance between the inner-side surface of the third lens element and an inner-side conjugate surface of the lens system is BL, an axial distance between the outer-side surface of the first lens element and the inner-side surface of the third lens element is TD, a minimum among Abbe numbers of the three lens elements is Vdmin, a maximum among refractive indices of the three lens elements is Nmax, a focal length of the lens system is f, a focal length of the first lens element is f1, a focal length of the second lens element is f2, a focal length of the third lens element is f3, and the following conditions are satisfied:

$$-2.80 < (R1 + R6)/(R1 - R6) < 7.50;$$

$$0 < BL/TD < 1.0;$$

$$5.0 < V\!d\mathrm{min} < 25.0;$$

$$1.50 < N\mathrm{max} < 1.73;$$

and $$4.50 < |f/f1| + |f/f2| + |f/f3| < 12.0.$$

According to another aspect of the present disclosure, an electronic device includes a projection apparatus, the projection apparatus including a lens system and at least one light source, the lens system including three lens elements, which are, in order from an outer side to an inner side: a first lens element, a second lens element and a third lens element, wherein the first lens element has an outer-side surface being convex in a paraxial region thereof, the second lens element has an inner-side surface being concave in a paraxial region thereof, there is an air gap between each of adjacent lens elements of the lens system, a curvature radius of the outer-side surface of the first lens element is R1, a curvature radius of an inner-side surface of the third lens element is R6, an axial distance between the inner-side surface of the third lens element and an inner-side conjugate surface of the lens system is BL, an axial distance between the outer-side surface of the first lens element and the inner-side surface of the third lens element is TD, a minimum among Abbe numbers of the three lens elements is Vdmin, a maximum among refractive indices of the three lens elements is Nmax, a focal length of the lens system is f, a focal length of the second lens element is f2, a focal length of the third lens element is f3, and the following conditions are satisfied:

$$-2.80 < (R1 + R6)/(R1 - R6) < 7.50;$$

$$0 < BL/TD < 1.0;$$

$$5.0 < V\!d\mathrm{min} < 25.0;$$

-continued $$1.50 < N\text{max} < 1.73;$$

$$2.50 < |f/f2| + |f/f3| < 10.0;$$

and $$-0.80 < f/f3 < 5.0.$$

According to another aspect of the present disclosure, an electronic device includes a projection apparatus, the projection apparatus including a lens system and at least one light source, the lens system including three lens elements, which are, in order from an outer side to an inner side: a first lens element, a second lens element and a third lens element, wherein the first lens element with positive refractive power has an outer-side surface being convex in a paraxial region thereof, the third lens element with positive refractive power has an inner-side surface being convex in a paraxial region thereof, a curvature radius of the outer-side surface of the first lens element is R1, a curvature radius of the inner-side surface of the third lens element is R6, an axial distance between the inner-side surface of the third lens element and an inner-side conjugate surface of the lens system is BL, an axial distance between the outer-side surface of the first lens element and the inner-side surface of the third lens element is TD, a minimum among Abbe numbers of the three lens elements is Vdmin, a maximum among refractive indices of the three lens elements is Nmax, a curvature radius of an outer-side surface of the third lens element is R5, and the following conditions are satisfied:

$$-1.0 < (R1 + R6)/(R1 - R6) < 1.0;$$

$$0 < BL/TD < 1.0;$$

$$5.0 < V d\text{min} < 25.0;$$

$$1.50 < N\text{max} < 1.73;$$

and $$0 < (R5 + R6)/(R5 - R6) < 5.0.$$

BRIEF DESCRIPTION OF THE DRAWINGS

FIG. 11B is a rear view of an electronic device according to another embodiment of the present disclosure.

DETAILED DESCRIPTION

Figure 1A:
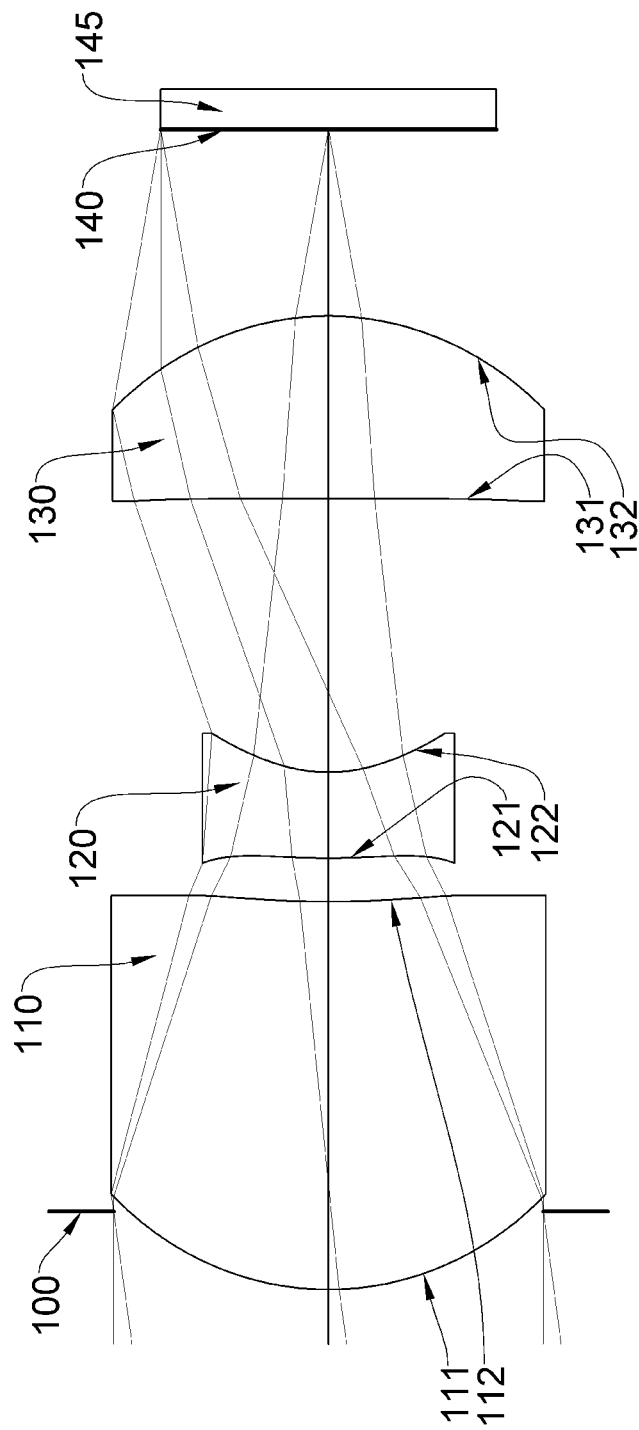
FIG. 1A is a schematic view of a projection apparatus according to the 1st embodiment of the present disclosure.

The present disclosure provides a lens system. The lens system includes three lens elements, and the three lens elements are, in order from an outer side to an inner side, a first lens element, a second lens element, and a third lens element.

The first lens element may have positive refractive power to enhance the optical path of the lens system for miniaturization. The first lens element has an outer-side surface being convex in a paraxial region thereof so as to strengthen the refractive power of the lens element and maintain proper refraction angles of the optical path.

The second lens element may have negative refractive power to balance the positive refractive power of the first lens element so as to reduce the sensibility of the lens system. The second lens element may have an inner-side surface being concave in a paraxial region thereof to attenuate light so as to favorably suppress the chief ray angle of the lens system. The second lens element may have an outer-side surface being convex in a paraxial region thereof to effectively adjust the light converging capability of the lens system to moderate the deviation of the optical path.

The third lens element may have positive refractive power to obtain telecentric property of light on an inner-side conjugate surface of the lens system so as to increase the overall illumination of the lens system. The third lens element may have an inner-side surface being convex in a paraxial region thereof to increase the symmetry of the lens system so as to strengthen the light converging quality and further increase the sensing accuracy of the lens system.

At least one lens surface of the three lens elements may have at least one inflection point thereon. By arranging a lens surface with an inflection point thereon, the lens system can correct off-axis aberrations, reduce the required number of the lens elements, shorten the total length of the system, and achieve miniaturization for being applicable in various electronic devices.

Each of the three lens elements may have at least one surface being aspheric and the second lens element may have at least one critical point thereon. By arranging a lens surface with a critical point thereon, the converging capability in a peripheral region of the lens system can be strengthened so as to provide comparable resolution in the peripheral region and the paraxial region.

There is an air gap between each of adjacent lens elements for increasing the design flexibility of the lens system so as to meet requirements such as controlling the size or improving converging capability.

A curvature radius of the outer-side surface of the first lens element is R1, and a curvature radius of the inner-side surface of the third lens element is R6. When the following condition is satisfied: −2.80<(R1+R6)/(R1−R6)<7.50, the shape of the outermost surface and the innermost surface of the lens system can be configured so as to optimize the symmetry of the focal points. Moreover, the following condition can be satisfied: −1.0<(R1+R6)/(R1−R6)<1.0. Moreover, the following condition can be satisfied: −0.20<(R1+R6)/(R1−R6)<0.20. Moreover, the following condition can be satisfied: −0.10<(R1+R6)/(R1−R6)<0.10.

An axial distance between the inner-side surface of the third lens element and the inner-side conjugate surface of the lens system is BL, an axial distance between the outer-side surface of the first lens element and the inner-side surface of the third lens element is TD. When the following condition is satisfied: 0<BL/TD<1.0, it is favorable for miniaturization of the lens system with sufficient illumination. Moreover, the following condition can be satisfied: 0<BL/TD<0.50. Moreover, the following condition can be satisfied: 0<BL/TD<0.30.

A minimum among Abbe numbers of the three lens elements is Vdmin. When the following condition is satisfied: 5.0<Vdmin<25.0, the material configurations of each lens element can be effectively controlled to correct the illumination of the lens system and increase energy transmission so as to improve the light converging quality. Moreover, the following condition can be satisfied: 10.0<Vdmin<20.0. The definition of an Abbe number of a single lens element is calculated by the following equation: Vd=(Nd−1)/(NF−NC), wherein Nd is the refractive index of the single lens element at the wavelength of d-line of helium (587.6 nm), NF is the refractive index of the single lens element at the wavelength of F-line of hydrogen (486.1 nm), and NC is the refractive index of the single lens element at the wavelength of C-line of hydrogen (656.3 nm).

A maximum among refractive indices of the three lens elements is Nmax. When the following condition is satisfied: 1.50<Nmax<1.73, proper materials of each lens element can be arranged in the lens system so as to effectively reduce the costs and size. Moreover, the following condition can be satisfied: 1.50<Nmax<1.70.

A focal length of the lens system is f, a focal length of the first lens element is f1, a focal length of the second lens element is f2, and a focal length of the third lens element is f3. When the following condition is satisfied: 4.50<|f/f1|+|f/f2|+|f/f3|<12.0, the refractive power of the lens elements can be favorably increased so as to control the total length of the lens system and reduce the size thereof. Moreover, the following condition can be satisfied: 6.0<|f/f1|+|f/f2|+|f/f3|<12.0.

The focal length of the lens system is f, the focal length of the second lens element is f2, and the focal length of the third lens element is f3. When the following condition is satisfied: 2.50<|f/f2|+|f/f3|<10.0, the second lens element and the third lens element can have sufficient refractive power to balance the power configuration in the lens system for various product applications. Moreover, the following condition can be satisfied: 4.0<|f/f2|+|f/f3|<9.0.

The focal length of the lens system is f, and the focal length of the third lens element is f3. When the following condition is satisfied: −0.80<f/f3<5.0, it is favorable for balancing the refractive power between the third lens element and the lens system for product applications. Moreover, the following condition can be satisfied: −0.50<f/f3<3.50.

A curvature radius of an outer-side surface of the third lens element is R5, and a curvature radius of the inner-side surface of the third lens element is R6. When the following condition is satisfied: 0<(R5+R6)/(R5−R6)<5.0, it is favorable for having higher light controlling capability at the inner-side surface of the third lens element so as to increase the symmetry of the lens system and reduce the sensitivity. Moreover, the following condition can be satisfied: 0.30<(R5+R6)/(R5−R6)<3.0. Moreover, the following condition can be satisfied: 0.70<(R5+R6)/(R5−R6)<2.20. Moreover, the following condition can be satisfied: 1.0<(R5+R6)/(R5−R6)<1.80.

The focal length of the first lens element is f1, the focal length of the second lens element is f2, and the focal length of the third lens element is f3. When the following conditions are satisfied: |f2|<|f1| and |f2|<|f3|, it is favorable for the second lens element having stronger refractive power so as to increase the symmetry of the lens system and improve light convergence.

A maximum effective radius on the outer-side surface of the first lens element is Y11, and a maximum effective radius on the inner-side surface of the third lens element is Y32. When the following condition is satisfied: 0.85<Y11/Y32<1.50, the ratio between effective diameters of the innermost lens surface and the outermost lens surface of the lens system can be adjusted so as to effectively increase the assembly yield of the lens system while maintaining light intensity.

A central thickness of the first lens element is CT1, a central thickness of the second lens element is CT2, and a central thickness of the third lens element is CT3. When the following condition is satisfied: 1.0 mm<CT1+CT2+CT3<2.50 mm, the thicknesses of the lens elements can be controlled to achieve both good manufacturability and miniaturization of the lens system, thereby reducing the size of the device.

Figure 7:
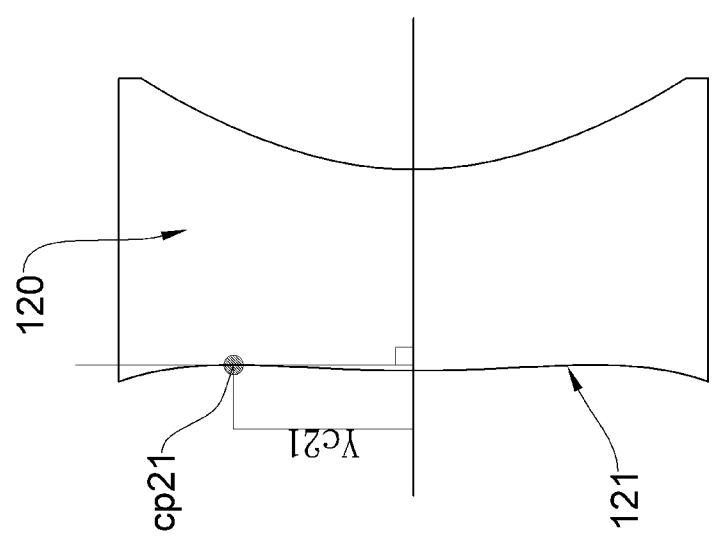
FIG. 7 is a schematic view showing the parameter Yc21 of a second lens element according to the 1st embodiment of the present disclosure as an example.

A vertical distance between a critical point in an off-axis region of an outer-side surface of the second lens element and an optical axis is Yc21, and the central thickness of the second lens element is CT2. When the following condition is satisfied: 0.10<Yc21/CT2<2.50, the second lens element with a critical point on the lens surface thereof can effectively correct aberrations of the system and maintain good focusing quality. Please refer to FIG. 7, which is a schematic view showing the parameter Yc21 of the second lens elements according to the 1st embodiment of the present disclosure as an example. The second lens element 120 has a critical point cp21 in an off-axis region of the outer-side surface 121 thereof, and the vertical distance between the critical point cp21 and the optical axis is Yc21.

The curvature radius of the outer-side surface of the first lens element is R1, and a curvature radius of an inner-side surface of the first lens element is R2. When the following condition is satisfied: −2.50<(R1+R2)/(R1−R2)<−0.50, it is favorable for the first lens element having stronger optical path controlling capability so as to control light path on the outer side and optimize the focal spot shape. Moreover, the following condition can be satisfied: −2.0<(R1+R2)/(R1−R2)<−1.0.

A curvature radius of the outer-side surface of the second lens element is R3, a curvature radius of an inner-side surface of the second lens element is R4. When the following condition is satisfied: 0.30<(R3+R4)/(R3−R4)<2.50, it is favorable for controlling the refractive angle on the inner-side surface of the second lens element, thereby balancing an effective radius of the third lens element to avoid an overly large size thereof. Moreover, the following condition can be satisfied: 1.0<(R3+R4)/(R3−R4)<2.30.

An axial distance between the first lens element and the second lens element is T12, and the central thickness of the first lens element is CT1. When the following condition is satisfied: 0.01<T12/CT1<0.20, it is favorable for controlling the light path on the outer side of the electronic device so as to further optimize the resolution. Moreover, the following condition can be satisfied: 0.02<T12/CT1<0.13.

The central thickness of the second lens element is CT2, and an axial distance between the second lens element and the third lens element is T23. When the following condition is satisfied: CT2<T23, it is favorable for having sufficient space between the second lens element and the third lens element so as to moderate the light path and provide a better range of viewing angles.

The axial distance between the first lens element and the second lens element is T12, and the axial distance between the second lens element and the three lens element is T23. When the following condition is satisfied: 0.01<T12/T23<0.70, the distances between the lens elements can be adjusted so as to moderate the incident angle of the light on the inner-side conjugate surface while improving the assembly yield of the lens system. Moreover, the following condition can be satisfied: 0.01<T12/T23<0.30.

An axial distance between the outer-side surface of the first lens element and the inner-side conjugate surface of the lens system is TL, and the focal length of the lens system is f. When the following condition is satisfied: 0.70<TL/f<1.0, it is favorable for focusing in a specified small area so as to provide the capability of a telephoto.

A maximum among maximum effective radii on outer-side surfaces and inner-side surfaces of the three lens elements is Ymax. When the following condition is satisfied: 0.1 mm<Ymax<1.0 mm, the maximum of the effective radii of all lens elements can be well controlled for miniaturization of the lens system.

An absolute value of a curvature radius of an inner-side surface of the second lens element can be the smallest among absolute values of surface curvature radii of the three lens elements, thereby controlling the optical path and providing a better resolution range.

Figure 8:
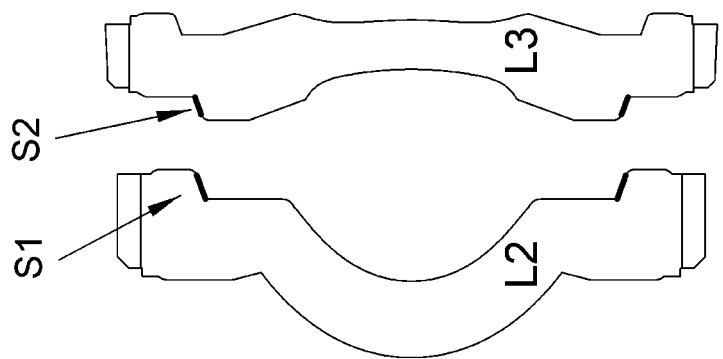
FIG. 8 is an exemplary schematic view of a fitting structure applicable to the lens system of the present disclosure.
Figure 8:
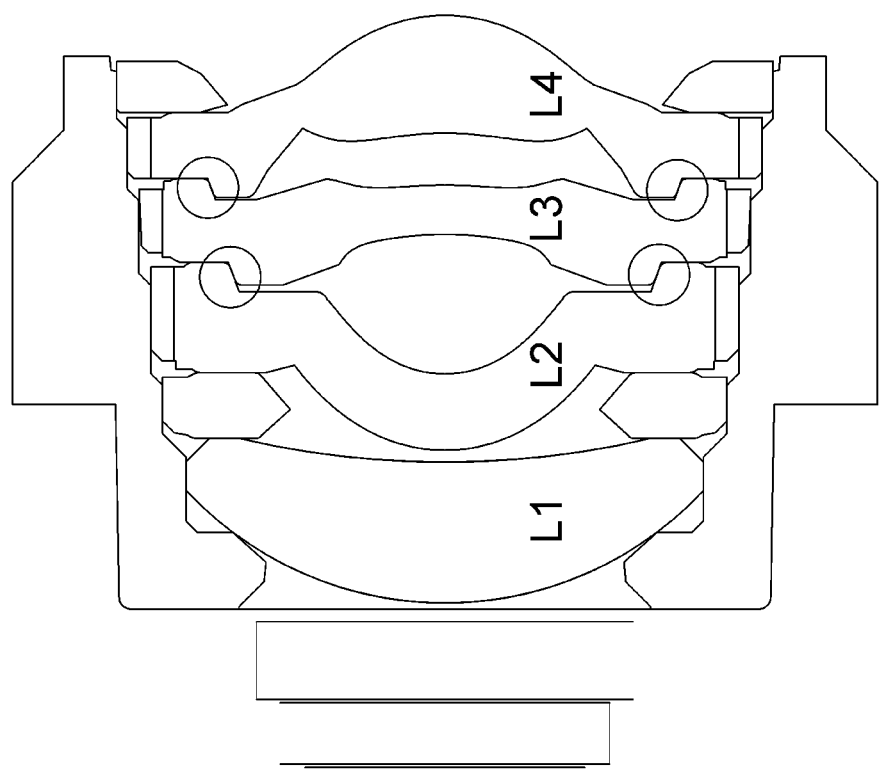

The lens system may include at least one fitting structure between each lens element. Please refer to FIG. 8, which is an example in the present disclosure. As shown in the right side of FIG. 8, there is a fitting structure between the second lens element L2 and the third lens element L3. The fitting structure is composed of a first axial assembling surface S1 of the second lens element L2 and a second axial assembling surface S2 of the third lens element L3, wherein the second axial assembling surface S2 can be assembled with respect to the first assembling surface S1, thereby aligning the axial centers of the second lens element L2 and the third lens element L3 to maintain good concentricity, and avoiding aberrations resulted from decentered lens elements so as to further optimize image quality.

The lens system of the present disclosure is applicable to an infrared wavelength range of 750~1600 nm. By providing an appropriate wavelength range, imaging can be free from interference of background noise while maintaining good sensing efficiency. Moreover, the lens system of the present disclosure is also applicable to the infrared wavelength range of 850~1600 nm.

The present disclosure provides a projection apparatus. The projection apparatus includes the lens system aforementioned, and at least one light source. The light source can be a laser, superluminescent diode (SLED), micro LED, resonant-cavity LED (RCLED), vertical-cavity surface-emitting laser (VCSEL) light source or the likes. The light source can be a single light source or multiple light sources disposed on the inner-side conjugate surface of the lens system to faithfully realize projections with high quality. When the light source of the projection apparatus in the present disclosure is a vertical-cavity surface-emitting laser light source and is disposed on the inner-side conjugate surface of the lens system, the projection apparatus 12 can be provided with a highly directional, low divergence and high intensity light source from a suitable arrangement of the light source such that the illuminance on an outer-side conjugate surface of the lens system can be increased.

The light from the light source passes through the lens system of the projection apparatus and forms a structured light. The structured light is further projected onto a detected object. The shape of the structured light can be a dot, a spot or a stripe structure but not limited.

The projection apparatus may include a diffusing element. The diffusing element can be disposed at the outer side of the first lens element. By arranging a diffusing element, the light can be favorably diffracted so as to provide structured light with higher regularity for improving recognition capability. The diffusing element in the present disclosure can be a diffuser, a raster or a combination thereof (but not limited). The surface of the diffusing element can have a micro structure (such as grating) to diffuse the light beam and duplicate the speckle pattern resulted therefrom so as to enlarge the projection angle of the projection apparatus.

The projection apparatus may include a component or a lens assembly with an adjustable focus. By arranging the adjustable focus component, the focal length of the lens system can be adjusted for different environmental factors so as to improve the image clarity. By arranging a lens assembly with reflection functionality, the size of the apparatus can be reduced and the space configuration can be more flexible.

The present disclosure provides an electronic device including a lens system and also provides an electronic device including the aforementioned projection device. The electronic device can be a smartphone in which the technology of 3-dimensional sensing such as gesture recognitions, face recognitions and augmented realities can be utilized so as to provide users with a brand new user experience and make human-computer interaction smoother and more convenient.

Each of the aforementioned features of the lens system can be utilized in numerous combinations, so as to achieve the corresponding effects.

According to the lens system of the present disclosure, the lens elements thereof can be made of glass or plastic material. When the lens elements are made of glass material, the distribution of the refractive power of the lens system may be more flexible to design. Technologies such as grinding or molding can be used for producing glass lens elements. When the lens elements are made of plastic material, manufacturing costs can be effectively reduced. Furthermore, surfaces of each lens element can be arranged to be aspheric (ASP). Since these aspheric surfaces can be easily formed into shapes other than spherical shapes so as to have more control variables for eliminating aberrations and to further decrease the required quantity of lens elements, the total track length of the lens system can be effectively reduced. Process such as plastic injection molding or molded glass lens can be used for making the aspheric surfaces.

According to the lens system of the present disclosure, if a surface of a lens element is aspheric, it means that the surface has an aspheric shape throughout its optically effective area, or in a portion(s) thereof.

When the lens element has a convex surface and the region of convex shape is not defined, it indicates that the surface can be convex in a paraxial region thereof. When the lens element has a concave surface and the region of concave shape is not defined, it indicates that the surface can be concave in a paraxial region thereof. Likewise, when the region of refractive power or focal length of a lens element is not defined, it indicates that the region of refractive power or focal length of the lens element can be in the paraxial region thereof.

According to the lens system, the projection apparatus, the detecting module and the electronic device described in the present disclosure, when values of parameters thereof are not defined specifically, the value of each parameter can be determined according to an operating wavelength of the lens system. If the operating wavelength is in visible light range (e.g. main wavelength thereof is 350~750 nm), the value of each parameter is calculated based on a wavelength of 587.6 nm (d-line). If the operating wavelength is in near-infrared range (e.g. main wavelength thereof is 750~1500 nm), the value of each parameter is calculated based on a wavelength of 940 nm.

According to the lens system of the present disclosure, an inflection point is a transition point on the lens surface where the curvature radius thereof changes between positive and negative at the transition point. A critical point is a tangent point on the lens surface with the line tangent to the tangent point being on a plane perpendicular to an optical axis.

According to the lens system of the present disclosure, the lens system can include at least one stop, such as an aperture stop, a glare stop or a field stop, disposed before the first lens element, between each lens element or behind the last lens element so as to favorably reduce the amount of stray light and thereby improving the image quality.

According to the lens system of the present disclosure, the aperture stop can be configured as a front stop or a middle stop. The front stop disposed between a detected object and the first lens element can effectively suppress the angle of the chief ray on the inner-side conjugate surface of the lens system such that there is a telecentric effect for improving the illuminations of the system. The middle stop disposed between the first lens element and the inner-side conjugate surface is favorable for enlarging the field of view of the lens system.

The outer side described in the present disclosure can be outside the mechanism while the inner side can be inside the mechanism. Please refer to FIG. 9A, which exemplarily illustrates a detecting module 10 including an imaging lens system 11a of a receiving apparatus 11 and a lens system 12a of the projection apparatus 12. The inner-side conjugate surface is a focal surface located inside the mechanism and is an image surface of the imaging lens system 11a. In the imaging lens system, the outer side of the imaging lens system 11a is the object side and the inner side of the imaging lens system 11a is the image side. In the lens system 12a of the projection apparatus 12, the outer side of the lens system 12a is a side closer to the detected object O (magnification side) and the outer side is a light-exiting surface while the inner side of the lens system 12a is a side closer to the light source 145 (reduction side) and the inner side is a light-entrance surface. As to a single lens element of the lens system 12a, an outer side of a lens element is a side toward the detected object and an outer-side surface of a lens element is a lens surface toward the detected object while an inner side of a lens element is a side toward the light source 145 (or conjugate surface 140) and an inner-side surface of a lens element is a lens surface toward the light source.

Regarding the lens system, the projection apparatus, the detecting module and the electronic device described in the present disclosure, the following specific embodiments are provided for further explanations.

1st Embodiment

Figure 1B:
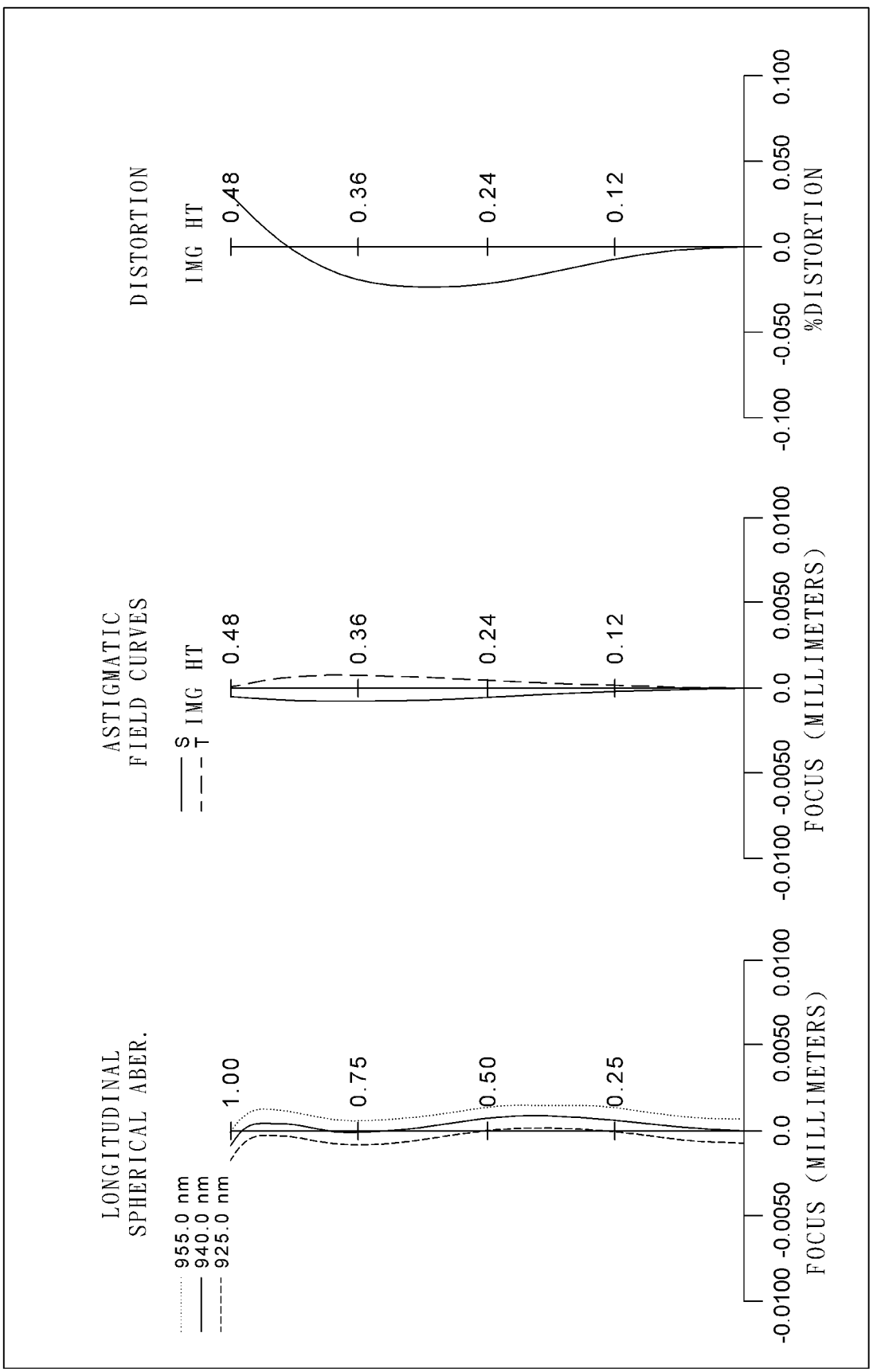
FIG. 1B shows longitudinal spherical aberration curves, astigmatic field curves and a distortion curve of the projection apparatus according to the 1st embodiment.

FIG. 1A is a schematic view of a projection apparatus according to the 1st embodiment of the present disclosure. FIG. 1B shows, in order from left to right, longitudinal spherical aberration curves, astigmatic field curves and a distortion curve of the projection apparatus according to the 1st embodiment.

In FIG. 1A, the projection apparatus includes a lens system (not otherwise herein labeled) of the present disclosure and a light source 145. The lens system includes, in order from an outer side to an inner side, an aperture stop 100, a first lens element 110, a second lens element 120, and a third lens element 130. There is an air gap between each of adjacent lens elements.

The first lens element 110 with positive refractive power has an outer-side surface 111 being convex in a paraxial region thereof and an inner-side surface 112 being concave in a paraxial region thereof. Both the outer-side surface 111 and the inner-side surface 112 are aspheric, and there is one inflection point on the inner-side surface 112 thereof. The first lens element 110 is made of plastic material.

The second lens element 120 with negative refractive power has an outer-side surface 121 being convex in a paraxial region thereof, and an inner-side surface 122 being concave in a paraxial region thereof. Both the outer-side surface 121 and the inner-side surface 122 are aspheric, and there are one inflection point and one critical point on the outer-side surface 121 thereof. The second lens element 120 is made of plastic material.

The third lens element 130 with positive refractive power has an outer-side surface 131 being convex in a paraxial region thereof, and an inner-side surface 132 being convex in a paraxial region thereof. Both the outer-side surface 131 and the inner-side surface 132 are aspheric, and there is one inflection point on the outer-side surface 131 thereof. The third lens element 130 is made of plastic material.

The light source 145 included in the projection apparatus is disposed on an inner-side conjugate surface 140 of the lens system.

The detailed optical data of the 1st embodiment are shown in TABLE 1, and the aspheric surface data are shown in TABLE 2, wherein the units of the curvature radius, the thickness and the focal length are expressed in mm, f is a focal length of the lens system, Fno is an f-number of the lens system, and HFOV is half of a maximal field of view, and surfaces #1 to #8 refer to the surfaces in order from the outer side to the inner side. The aspheric surface data are shown in TABLE 2, wherein k is the conic coefficient in the equation of the aspheric surface profiles, and A4-A8 refer to the 4th to 8th order aspheric coefficients.

Furthermore, it should be noted that the tables shown in each of the following embodiments are associated with the schematic view and diagrams of longitudinal spherical aberration curves, astigmatic field curves and a distortion curve for the respective embodiment. Also, the definitions of the parameters presented in later tables are the same as those of the parameters presented in TABLE 1 and TABLE 2 for the 1st embodiment. Explanations in this regard will not be provided again.

TABLE 1

(1st Embodiment)
f = 3.50 mm, Fno = 2.87, HFOV = 7.7 deg.

| Surface # | | Curvature Radius | | Thickness | Material | Index | Abbe # | Focal Length |
|---|---|---|---|---|---|---|---|---|
| 0 | Object | Planar | | 400.000 | | | | |
| 1 | Ape. Stop | Planar | | −0.221 | | | | |
| 2 | Lens 1 | 0.815 | ASP | 1.100 | Plastic | 1.536 | 56.1 | 1.83 |
| 3 | | 2.518 | ASP | 0.123 | | | | |
| 4 | Lens 2 | 1.726 | ASP | 0.244 | Plastic | 1.641 | 19.4 | −0.97 |
| 5 | | 0.433 | ASP | 0.776 | | | | |
| 6 | Lens 3 | 230.881 | ASP | 0.518 | Plastic | 1.535 | 56.0 | 1.50 |
| 7 | | −0.805 | ASP | 0.529 | | | | |
| 8 | Light Source | Planar | | — | | | | |

* Reference wavelength is 940.0 nm.

TABLE 2

Aspheric Coefficient

| Surface # | 2 | 3 | 4 | 5 | 6 | 7 |
|---|---|---|---|---|---|---|
| k = | −1.6101E−01 | −6.8815E−01 | 1.0396E+00 | −1.1134E+00 | 9.0000E+01 | −1.5422E−01 |
| A4 = | 1.0747E−03 | −5.0294E−01 | −3.1909E+00 | −1.8950E+00 | −6.0769E−02 | 3.3320E−02 |
| A6 = | 8.8577E−03 | 1.4628E+00 | 2.0252E+00 | 7.1493E+00 | −8.7992E−02 | 1.4314E−02 |
| A8 = | | −9.8129E+00 | −1.3298E+01 | | | −3.6556E−03 |

The equation of the aspheric surface profiles is expressed as follows:

$$X(Y) = (Y^2/R)/(1 + \mathrm{sqrt}(1 - (1+k)*(Y/R)^2)) + \sum_{i}(Ai)*(Y^i)$$

where:
X is the relative distance between a point on the aspheric surface spaced at a distance Y from the optical axis and the tangential plane at the aspheric surface vertex on the optical axis;
Y is the vertical distance from the point on the aspheric surface profile to the optical axis;
R is the curvature radius;
k is the conic coefficient; and
Ai is the i-th aspheric coefficient.

In the 1st embodiment, the focal length of the lens system is f, the f-number of the lens system is Fno, and half of the maximal field of view of the lens system is HFOV. These parameters have the following values: f=3.50 mm; Fno=2.87; and HFOV=7.7 degrees.

In the 1st embodiment, a minimum among Abbe numbers of the three lens elements is Vdmin, and it satisfies the condition: Vdmin=19.4. (the Abbe number of the second lens element 120 is the minimum.)

In the 1st embodiment, a maximum among refractive indices of the three lens elements, and it satisfies the condition: Nmax=1.641. (the refractive index of the second lens element 120 is the minimum.)

In the 1st embodiment, an axial distance between the first lens element 110 and the second lens element 120 is T12, and a central thickness of the first lens element 110 is CT1. They satisfy the condition: T12/CT1=0.11.

In the 1st embodiment, the axial distance between the first lens element 110 and the second lens element 120 is T12, and an axial distance between the second lens element 120 and the third lens element 130 is T23. They satisfy the condition: T12/T23=0.16.

In the 1st embodiment, a curvature radius of the outer-side surface 111 of the first lens element 110 is R1, and a curvature radius of the inner-side surface 112 of the first lens element 110 is R2. They satisfy the condition: (R1+R2)/(R1−R2)=−1.96.

In the 1st embodiment, a curvature radius of the outer-side surface 121 of the second lens element 120 is R3, and a curvature radius of the inner-side surface 122 of the second lens element 120 is R4. They satisfy the condition: (R3+R4)/(R3−R4)=1.67.

In the 1st embodiment, a curvature radius of the outer-side surface 131 of the third lens element 130 is R5, and a curvature radius of the inner-side surface 132 of the third lens element 130 is R6. They satisfy the condition: (R5+R6)/(R5−R6)=0.99.

In the 1st embodiment, the curvature radius of the outer-side surface 111 of the first lens element 110 is R1, and the curvature radius of the inner-side surface 132 the third lens element 130 is R6. They satisfy the condition: (R1+R6)/(R1−R6)=0.01.

In the 1st embodiment, the focal length of the lens system is f, and a focal length of the third lens element 130 is f3. They satisfy the condition: f/f3=2.33.

In the 1st embodiment, the focal length of the lens system is f, a focal length of the second lens element 120 is f2, and the focal length of the third lens element 130 is f3. They satisfy the condition: |f/f2|+|f/f3|=5.93.

In the 1st embodiment, the focal length of the first lens element is f1, the focal length of the second lens element 120 is f2, and the focal length of the third lens element 130 is f3. They satisfy the condition: |f/f1|+|f/f2|+|f/f3|=7.84.

In the 1st embodiment, the central thickness of the first lens element 110 is CT1, a central thickness of the second lens element 120 is CT2, and a central thickness of the third lens element 130 is CT3. They satisfy the condition: CT1+CT2+CT3=1.86 (mm).

In the 1st embodiment, a maximum among maximum effective radii on outer-side surfaces and inner-side surfaces of the three lens elements is Ymax and it satisfies the condition: Ymax=0.62 (mm). (The maximum effective radius of the outer-side surface 111 of the first lens element 110 is the maximum.)

In the 1st embodiment, a vertical distance between a critical point in an off-axis region of the outer-side surface 121 of the second lens element 120 and an optical axis is Yc21, and a central thickness of the second lens element 120 is CT2. They satisfy the condition: Yc21/CT2=0.90.

In the 1st embodiment, a maximum effective radius on the outer-side surface 111 of the first lens element 110 is Y11, and a maximum effective radius on the inner-side surface 132 of the third lens element 130 is Y32. They satisfy the condition: Y11/Y32=1.01.

In the 1st embodiment, an axial distance between the outer-side surface 111 of the first lens element 110 and the inner-side conjugate surface 140 of the lens system is TL, and the focal length of the lens system is f They satisfy the condition: TL/f=0.94.

In the 1st embodiment, an axial distance between the inner-side surface 132 of the third lens element 130 and the inner-side conjugate surface 140 of the lens system is BL, and an axial distance between the outer-side surface 111 of the first lens element 110 and the inner-side surface 132 of the third lens element 130 is TD. They satisfy the condition: BL/TD=0.19.

2nd Embodiment

Figure 2A:
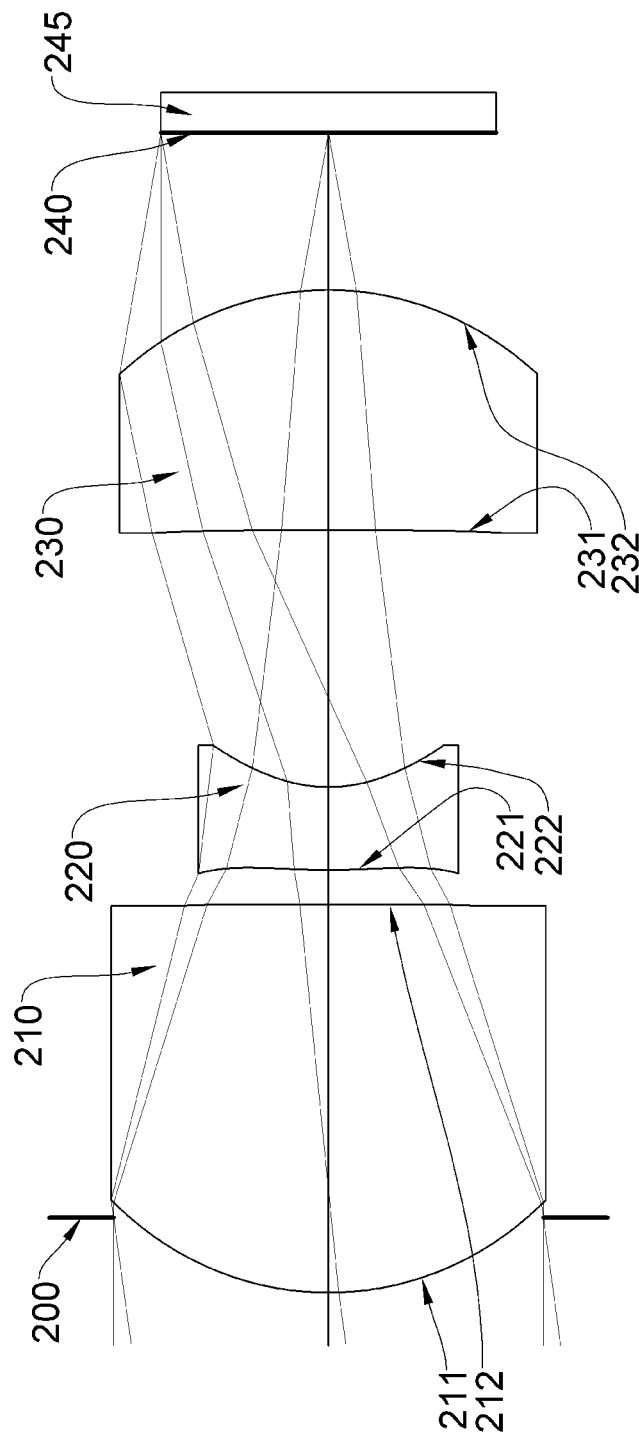
FIG. 2A is a schematic view of a projection apparatus according to the 2nd embodiment of the present disclosure.
Figure 2B:
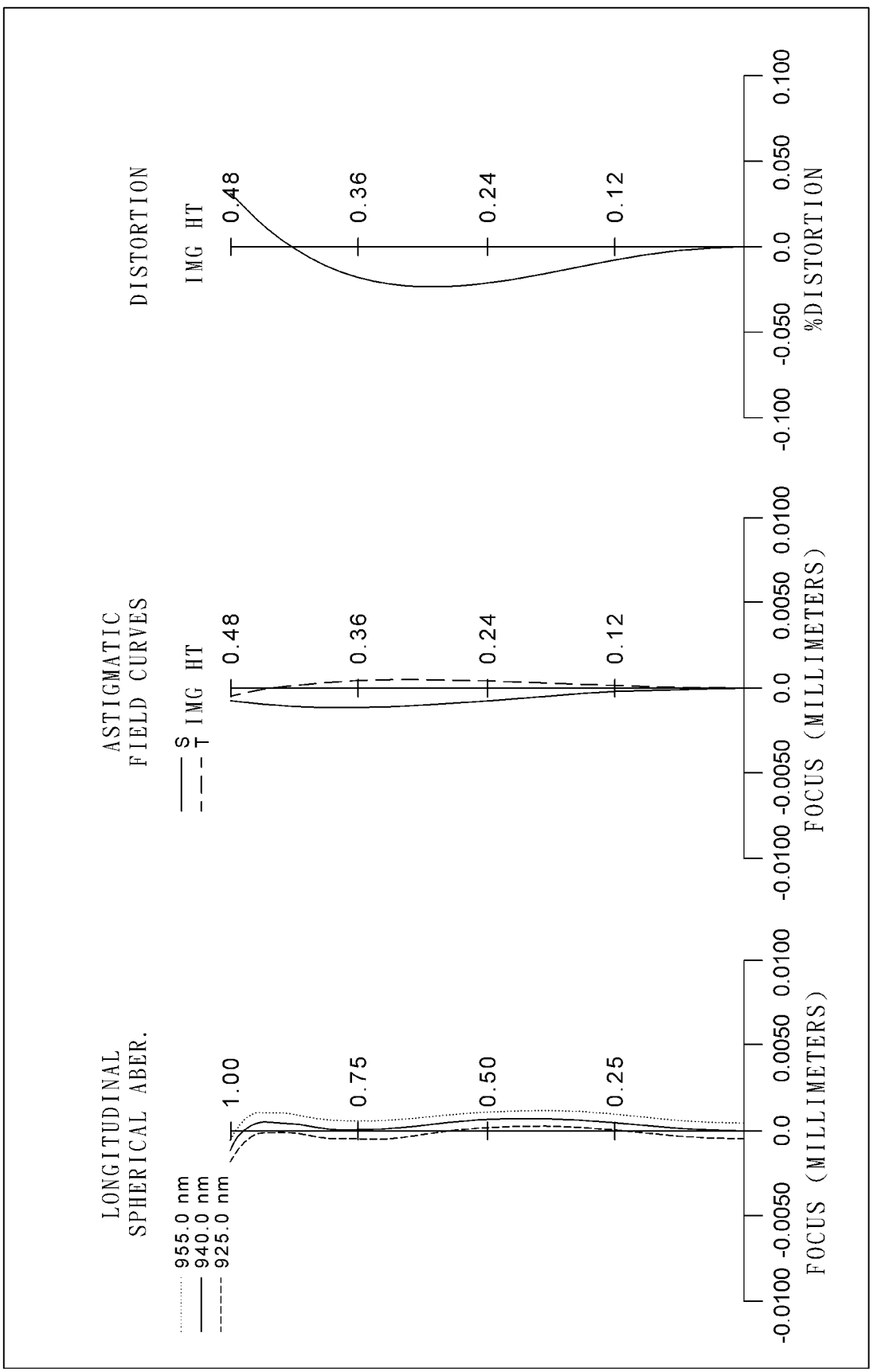
FIG. 2B shows longitudinal spherical aberration curves, astigmatic field curves and a distortion curve of the projection apparatus according to the 2nd embodiment.

FIG. 2A is a schematic view of a projection apparatus according to the 2nd embodiment of the present disclosure. FIG. 2B shows, in order from left to right, longitudinal spherical aberration curves, astigmatic field curves and a distortion curve of the projection apparatus according to the 2nd embodiment.

In FIG. 2A, the projection apparatus includes a lens system (not otherwise herein labeled) of the present disclosure and a light source 245. The lens system includes, in order from an outer side to an inner side, an aperture stop 200, a first lens element 210, a second lens element 220, and a third lens element 230. There is an air gap between each of adjacent lens elements.

The first lens element 210 with positive refractive power has an outer-side surface 211 being convex in a paraxial region thereof, and an inner-side surface 212 being convex in a paraxial region thereof. Both the outer-side surface 211 and the inner-side surface 212 are aspheric, and there are two inflection points on the inner-side surface 212 thereof. The first lens element 210 is made of plastic material.

The second lens element 220 with negative refractive power has an outer-side surface 221 being convex in a paraxial region thereof, and an inner-side surface 222 being concave in a paraxial region thereof. Both the outer-side surface 221 and the inner-side surface 222 are aspheric, and there are one inflection point and one critical point on the outer-side surface 221 thereof. The second lens element 220 is made of plastic material.

The third lens element 230 with positive refractive power has an outer-side surface 231 being concave in a paraxial region thereof, and an inner-side surface 232 being convex in a paraxial region thereof. Both the outer-side surface 231 and the inner-side surface 232 are aspheric. The third lens element 230 is made of plastic material.

The light source 245 included in the projection apparatus is disposed on an inner-side conjugate surface 240 of the lens system.

The detailed optical data of the 2nd embodiment are shown in TABLE 3, and the aspheric surface data are shown in TABLE 4.

TABLE 3

(2nd Embodiment)
f = 3.50 mm, Fno = 2.87, HFOV = 7.7 deg.

| Surface # | | Curvature Radius | Thickness | Material | Index | Abbe # | Focal Length |
|---|---|---|---|---|---|---|---|
| 0 | Object | Planar | 400.000 | | | | |
| 1 | Ape. Stop | Planar | −0.213 | | | | |
| 2 | Lens 1 | 0.835 ASP | 1.100 | Plastic | 1.536 | 56.1 | 1.55 |
| 3 | | −191.902 ASP | 0.099 | | | | |
| 4 | Lens 2 | 2.233 ASP | 0.235 | Plastic | 1.641 | 19.4 | −0.82 |
| 5 | | 0.410 ASP | 0.728 | | | | |
| 6 | Lens 3 | −70.929 ASP | 0.682 | Plastic | 1.535 | 56.0 | 1.55 |
| 7 | | −0.824 ASP | 0.446 | | | | |
| 8 | Light Source | Planar | — | | | | |

* Reference wavelength is 940.0 nm.

TABLE 4

| Aspheric Coefficient | | | | | | |
|---|---|---|---|---|---|---|
| Surface # | 2 | 3 | 4 | 5 | 6 | 7 |
| k = | −1.6115E−01 | −4.4051E+01 | 1.7967E+01 | −9.5644E−01 | −7.9201E+01 | −2.1030E−01 |
| A4 = | 4.3466E−03 | 1.1178E−01 | −2.3657E+00 | −1.6325E+00 | −7.9869E−02 | 1.4107E−02 |
| A6 = | 1.2356E−02 | −2.4026E−01 | 7.8056E−01 | 5.1250E+00 | −7.2810E−02 | 1.0737E−02 |
| A8 = | | −4.6191E+00 | −1.2957E+01 | | | −1.9248E−02 |

In the 2nd embodiment, the equation of the aspheric surface profiles of the aforementioned lens elements is the same as the equation of the 1st embodiment. Also, the definitions of these parameters shown in table below are the same as those stated in the 1st embodiment with corresponding values for the 2nd embodiment, so an explanation in this regard will not be provided again.

Moreover, these parameters can be calculated from TABLE 3 and TABLE 4 and satisfy the conditions stated in table below.

| 2nd Embodiment | | | |
|---|---|---|---|
| f [mm] | 3.50 | (R1 + R6)/(R1 − R6) | 0.01 |
| Fno. | 2.87 | f/f3 | 2.25 |
| HFOV [deg.] | 7.7 | \|f/f2\| + \|f/f3\| | 6.50 |
| Vdmin | 19.4 | \|f/f1\| + \|f/f2\| + \|f/f3\| | 8.75 |
| Nmax | 1.641 | CT1 + CT2 + CT3 [mm] | 2.02 |
| T12/CT1 | 0.09 | Ymax [mm] | 0.62 |
| T12/T23 | 0.14 | Yc21/CT2 | 0.98 |
| (R1 + R2)/(R1 − R2) | −0.99 | Y11/Y32 | 1.04 |
| (R3 + R4)/(R3 − R4) | 1.45 | TL/f | 0.94 |
| (R5 + R6)/(R5 − R6) | 1.02 | BL/TD | 0.16 |

3rd Embodiment

Figure 3A:
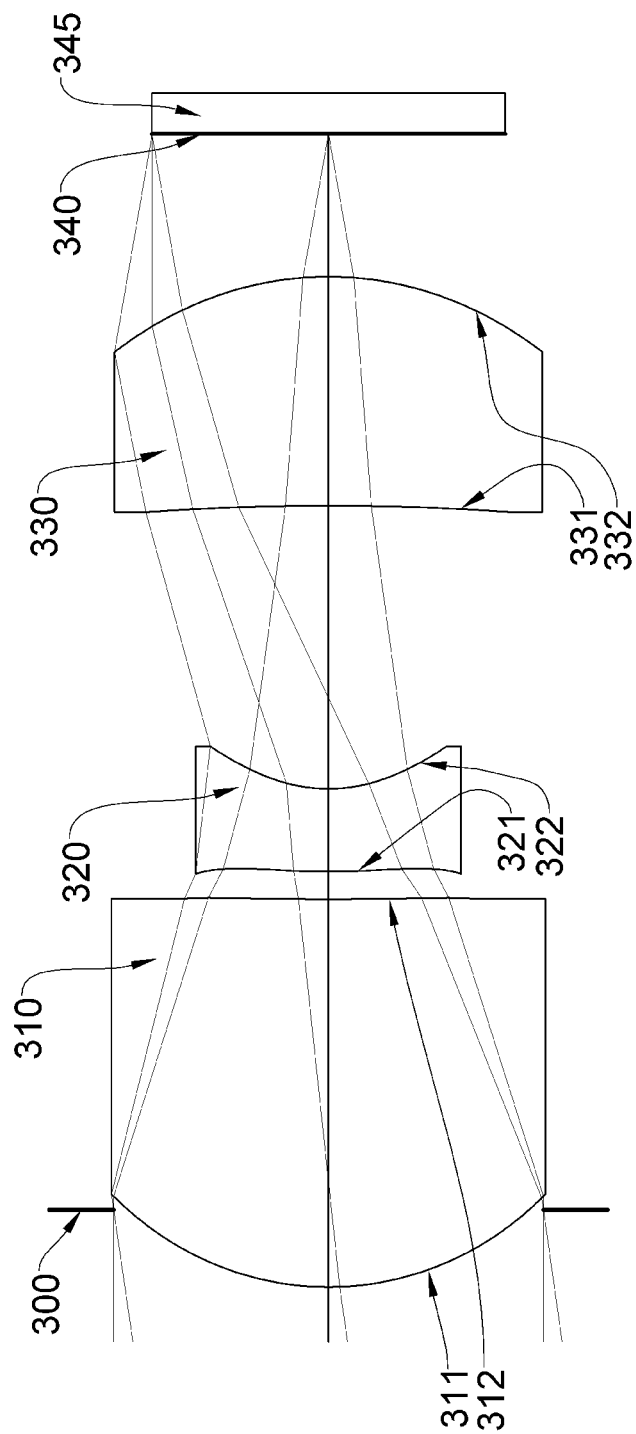
FIG. 3A is a schematic view of a projection apparatus according to the 3rd embodiment of the present disclosure.
Figure 3B:
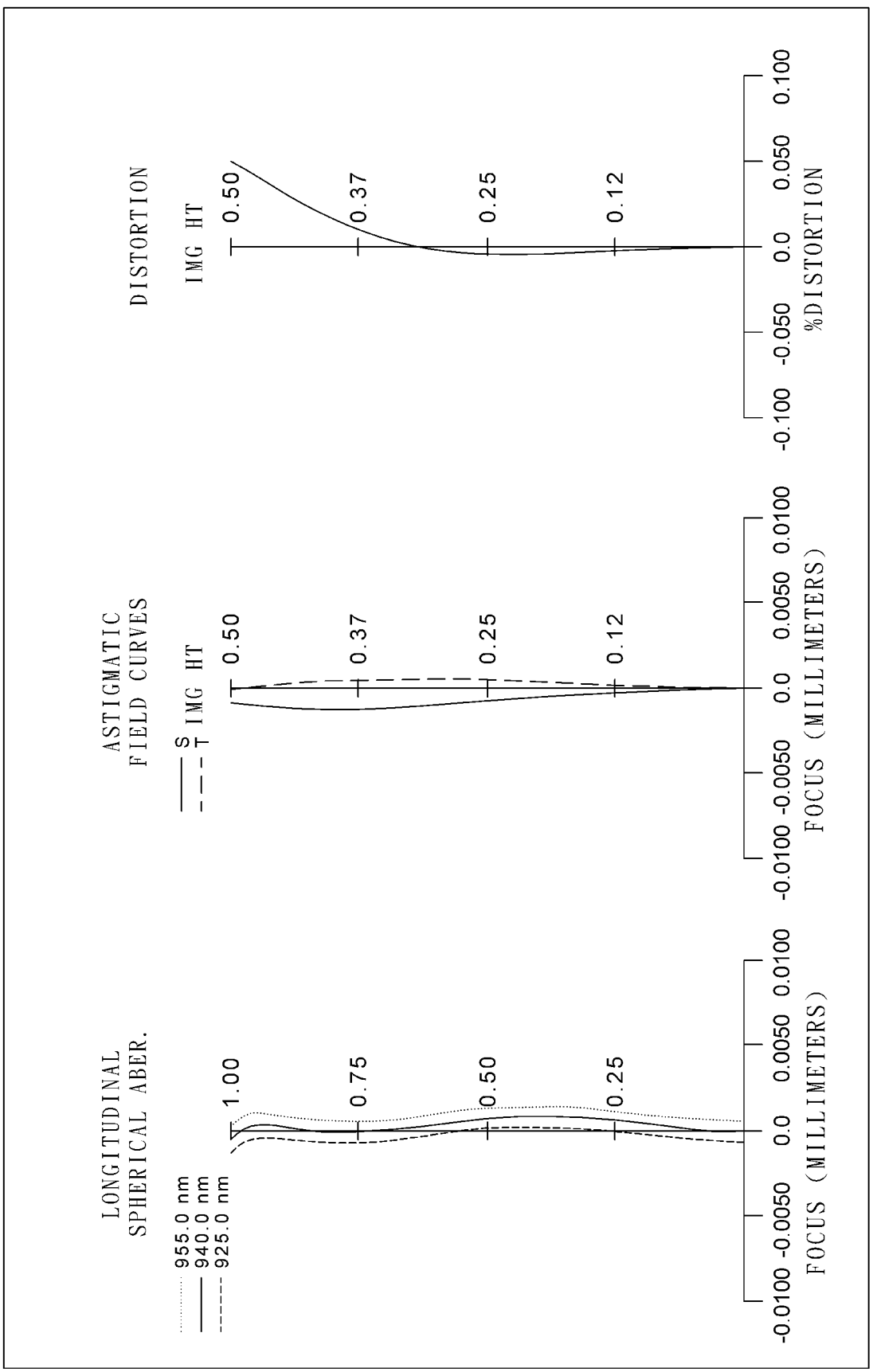
FIG. 3B shows longitudinal spherical aberration curves, astigmatic field curves and a distortion curve of the projection apparatus according to the 3rd embodiment.

FIG. 3A is a schematic view of a projection apparatus according to the 3rd embodiment of the present disclosure. FIG. 3B shows, in order from left to right, longitudinal spherical aberration curves, astigmatic field curves and a distortion curve of the projection apparatus according to the 3rd embodiment.

In FIG. 3A, the projection apparatus includes a lens system (not otherwise herein labeled) of the present disclosure and a light source 345. The lens system includes, in order from an outer side to an inner side, an aperture stop 300, a first lens element 310, a second lens element 320, and a third lens element 330. There is an air gap between each of adjacent lens elements.

The first lens element 310 with positive refractive power has an outer-side surface 311 being convex in a paraxial region thereof, and an inner-side surface 312 being concave in a paraxial region thereof. Both the outer-side surface 311 and the inner-side surface 312 are aspheric, and there is one inflection point on the inner-side surface 312 thereof. The first lens element 310 is made of plastic material.

The second lens element 320 with negative refractive power has an outer-side surface 321 being convex in a paraxial region thereof, and an inner-side surface 322 being concave in a paraxial region thereof. Both the outer-side surface 321 and the inner-side surface 322 are aspheric, and there are one inflection point and one critical point on the inner-side surface 322 thereof. The second lens element 320 is made of plastic material.

The third lens element 330 with positive refractive power has an outer-side surface 331 being concave in a paraxial region thereof, and an inner-side surface 332 being convex in a paraxial region thereof. Both the outer-side surface 331 and the inner-side surface 332 are aspheric. The third lens element 330 is made of plastic material.

The light source 345 included in the projection apparatus is disposed on an inner-side conjugate surface 340 of the lens system.

The detailed optical data of the 3rd embodiment are shown in TABLE 5, and the aspheric surface data are shown in TABLE 6.

TABLE 5

(3rd Embodiment)
f = 3.49 mm, Fno = 2.91, HFOV = 8.1 deg.

| Surface # | | Curvature Radius | | Thickness | Material | Index | Abbe # | Focal Length |
|---|---|---|---|---|---|---|---|---|
| 0 | Object | Planar | | 400.000 | | | | |
| 1 | Ape. Stop | Planar | | −0.219 | | | | |
| 2 | Lens 1 | 0.832 | ASP | 1.100 | Plastic | 1.536 | 56.1 | 1.61 |
| 3 | | 12.122 | ASP | 0.078 | | | | |
| 4 | Lens 2 | 1.826 | ASP | 0.235 | Plastic | 1.634 | 20.4 | −0.93 |
| 5 | | 0.425 | ASP | 0.803 | | | | |
| 6 | Lens 3 | −8.118 | ASP | 0.650 | Plastic | 1.634 | 20.4 | 1.62 |
| 7 | | −0.940 | ASP | 0.405 | | | | |
| 8 | Light Source | Planar | | — | | | | |

* Reference wavelength is 940.0 nm.

TABLE 6

Aspheric Coefficient

| Surface # | 2 | 3 | 4 | 5 | 6 | 7 |
|---|---|---|---|---|---|---|
| k = | −1.4363E−01 | −9.9000E+01 | 1.1524E+01 | −8.4375E−01 | −9.9000E+01 | −2.3646E−01 |
| A4 = | 1.6236E−03 | −1.0885E−03 | −2.2956E+00 | −1.5125E+00 | −5.9733E−02 | −5.0579E−03 |
| A6 = | 1.0931E−02 | 2.5879E−01 | 2.3824E−01 | 3.2494E+00 | 7.0589E−02 | 2.2086E−02 |
| A8 = | | −8.1284E+00 | −1.6394E+01 | | | −9.4838E−03 |

In the 3rd embodiment, the equation of the aspheric surface profiles of the aforementioned lens elements is the same as the equation of the 1st embodiment. Also, the definitions of these parameters shown in table below are the same as those stated in the 1st embodiment with corresponding values for the 3rd embodiment, so an explanation in this regard will not be provided again.

Moreover, these parameters can be calculated from TABLE 5 and TABLE 6 and satisfy the conditions stated in table below.

| 3rd Embodiment | | | |
|---|---|---|---|
| f [mm] | 3.49 | (R1 + R6)/(R1 − R6) | −0.06 |
| Fno. | 2.91 | f/f3 | 2.15 |
| HFOV [deg.] | 8.1 | \|f/f2\| + \|f/f3\| | 5.89 |
| Vdmin | 20.4 | \|f/f1\| + \|f/f2\| + \|f/f3\| | 8.05 |
| Nmax | 1.634 | CT1 + CT2 + CT3 [mm] | 1.99 |
| T12/CT1 | 0.07 | Ymax [mm] | 0.62 |
| T12/T23 | 0.10 | Yc21/CT2 | 1.09 |
| (R1 + R2)/(R1 − R2) | −1.15 | Y11/Y32 | 1.02 |
| (R3 + R4)/(R3 − R4) | 1.61 | TL/f | 0.94 |
| (R5 + R6)/(R5 − R6) | 1.26 | BL/TD | 0.14 |

4th Embodiment

Figure 4A:
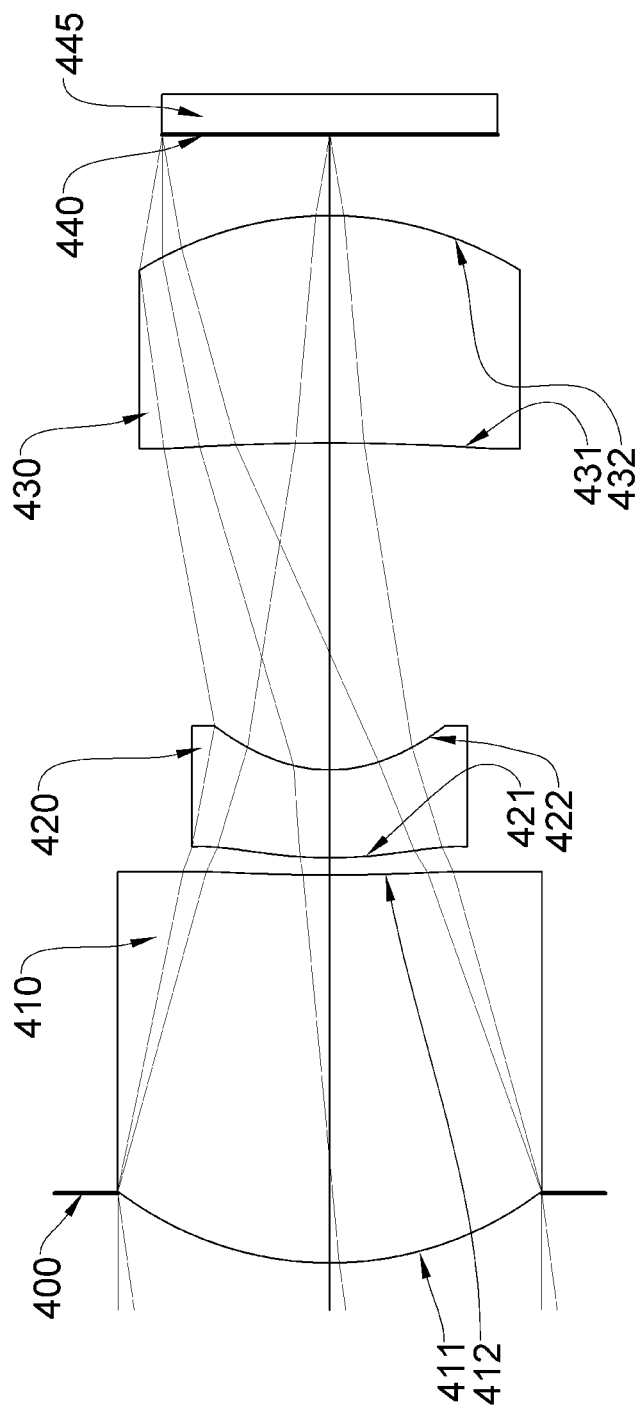
FIG. 4A is a schematic view of a projection apparatus according to the 4th embodiment of the present disclosure.
Figure 4B:
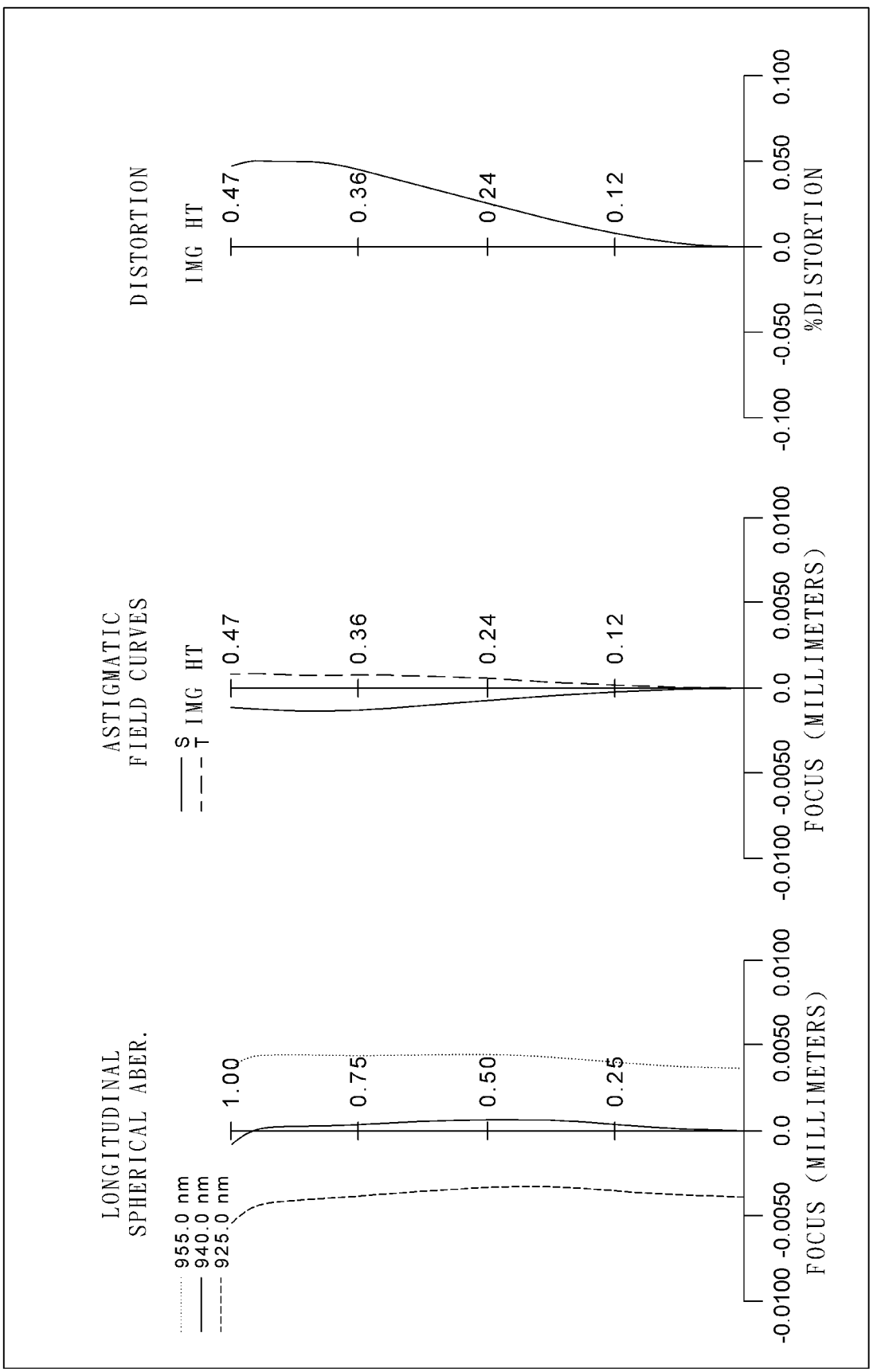
FIG. 4B shows longitudinal spherical aberration curves, astigmatic field curves and a distortion curve of the projection apparatus according to the 4th embodiment.

FIG. 4A is a schematic view of a projection apparatus according to the 4th embodiment of the present disclosure. FIG. 4B shows, in order from left to right, longitudinal spherical aberration curves, astigmatic field curves and a distortion curve of the projection apparatus according to the 4th embodiment.

In FIG. 4A, the projection apparatus includes a lens system (not otherwise herein labeled) of the present disclosure and a light source 445. The lens system includes, in order from an outer side to an inner side, an aperture stop 400, a first lens element 410, a second lens element 420, and a third lens element 430. There is an air gap between each of adjacent lens elements.

The first lens element 410 with positive refractive power has an outer-side surface 411 being convex in a paraxial region thereof, and an inner-side surface 412 being concave in a paraxial region thereof. Both the outer-side surface 411 and the inner-side surface 412 are aspheric, and there is one inflection point on the inner-side surface 412 thereof. The first lens element 410 is made of plastic material.

The second lens element 420 with negative refractive power has an outer-side surface 421 being convex in a paraxial region thereof, and an inner-side surface 422 being concave in a paraxial region thereof. Both the outer-side surface 421 and the inner-side surface 422 are aspheric, and there are one inflection point and one critical point on the outer-side surface 421 thereof. The second lens element 420 is made of plastic material.

The third lens element 430 with positive refractive power has an outer-side surface 431 being concave in a paraxial region thereof, and an inner-side surface 432 being convex in a paraxial region thereof. Both the outer-side surface 431 and the inner-side surface 432 are aspheric. The third lens element 430 is made of plastic material.

The light source 445 included in the projection apparatus is disposed on an inner-side conjugate surface 440 of the lens system.

The detailed optical data of the 4th embodiment are shown in TABLE 7, and the aspheric surface data are shown in TABLE 8.

TABLE 7

(4th Embodiment)

f = 3.49 mm, Fno = 2.91, HFOV = 7.7 deg.

| Surface # | | Curvature Radius | Thickness | Material | Index | Abbe # | Focal Length |
|---|---|---|---|---|---|---|---|
| 0 | Object | Planar | 400.000 | | | | |
| 1 | Ape. Stop | Planar | −0.198 | | | | |
| 2 | Lens 1 | 0.980 ASP | 1.100 | Plastic | 1.641 | 19.4 | 1.73 |
| 3 | | 4.747 ASP | 0.049 | | | | |
| 4 | Lens 2 | 1.143 ASP | 0.249 | Plastic | 1.641 | 19.4 | −1.19 |
| 5 | | 0.418 ASP | 0.927 | | | | |
| 6 | Lens 3 | −7.042 ASP | 0.646 | Plastic | 1.641 | 19.4 | 1.74 |
| 7 | | −0.998 ASP | 0.229 | | | | |
| 8 | Light Source | Planar | — | | | | |

* Reference wavelength is 940.0 nm.

TABLE 8

| Aspheric Coefficient | | | | | | |
|---|---|---|---|---|---|---|
| Surface # | 2 | 3 | 4 | 5 | 6 | 7 |
| k = | −1.9305E−01 | −9.8972E+01 | 4.1263E+00 | −5.7793E−01 | −9.9000E+01 | −1.0783E−01 |
| A4 = | 1.2530E−02 | −4.0462E−02 | −1.6636E+00 | −9.4061E−01 | −7.4709E−02 | 8.3248E−03 |
| A6 = | 1.5918E−02 | −4.3006E−02 | −1.8618E+00 | −1.4384E+00 | 1.4448E−01 | 4.1756E−02 |
| A8 = | | −6.5113E+00 | −9.1243E+00 | 4.9643E+00 | | 2.4996E−02 |
| A10 = | | 8.8257E+00 | −6.6654E+00 | | | |

In the 4th embodiment, the equation of the aspheric surface profiles of the aforementioned lens elements is the same as the equation of the 1st embodiment. Also, the definitions of these parameters shown in table below are the same as those stated in the 1st embodiment with corresponding values for the 4th embodiment, so an explanation in this regard will not be provided again.

Moreover, these parameters can be calculated from TABLE 7 and TABLE 8 and satisfy the conditions stated in table below.

| 4th Embodiment | | | |
|---|---|---|---|
| f [mm] | 3.49 | (R1 + R6)/(R1 − R6) | −0.01 |
| Fno. | 2.91 | f/f3 | 2.00 |
| HFOV [deg.] | 7.7 | \|f/f2\| + \|f/f3\| | 4.94 |
| Vdmin | 19.4 | \|f/f1\| + \|f/f2\| + \|f/f3\| | 6.96 |
| Nmax | 1.641 | CT1 + CT2 + CT3 [mm] | 1.99 |
| T12/CT1 | 0.04 | Ymax [mm] | 0.60 |
| T12/T23 | 0.05 | Yc21/CT2 | 1.44 |
| (R1 + R2)/(R1 − R2) | −1.52 | Y11/Y32 | 1.12 |
| (R3 + R4)/(R3 − R4) | 2.15 | TL/f | 0.92 |
| (R5 + R6)/(R5 − R6) | 1.33 | BL/TD | 0.08 |

5th Embodiment

Figure 5A:
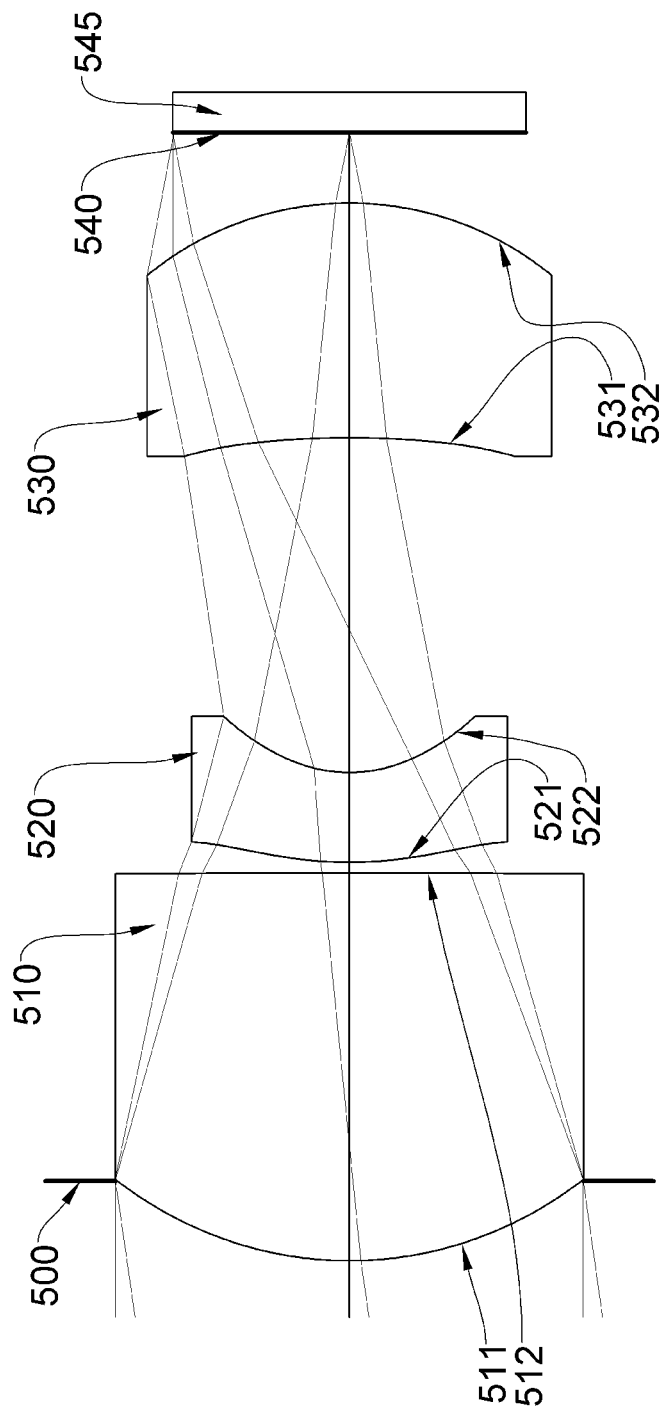
FIG. 5A is a schematic view of a projection apparatus according to the 5th embodiment of the present disclosure.
Figure 5B:
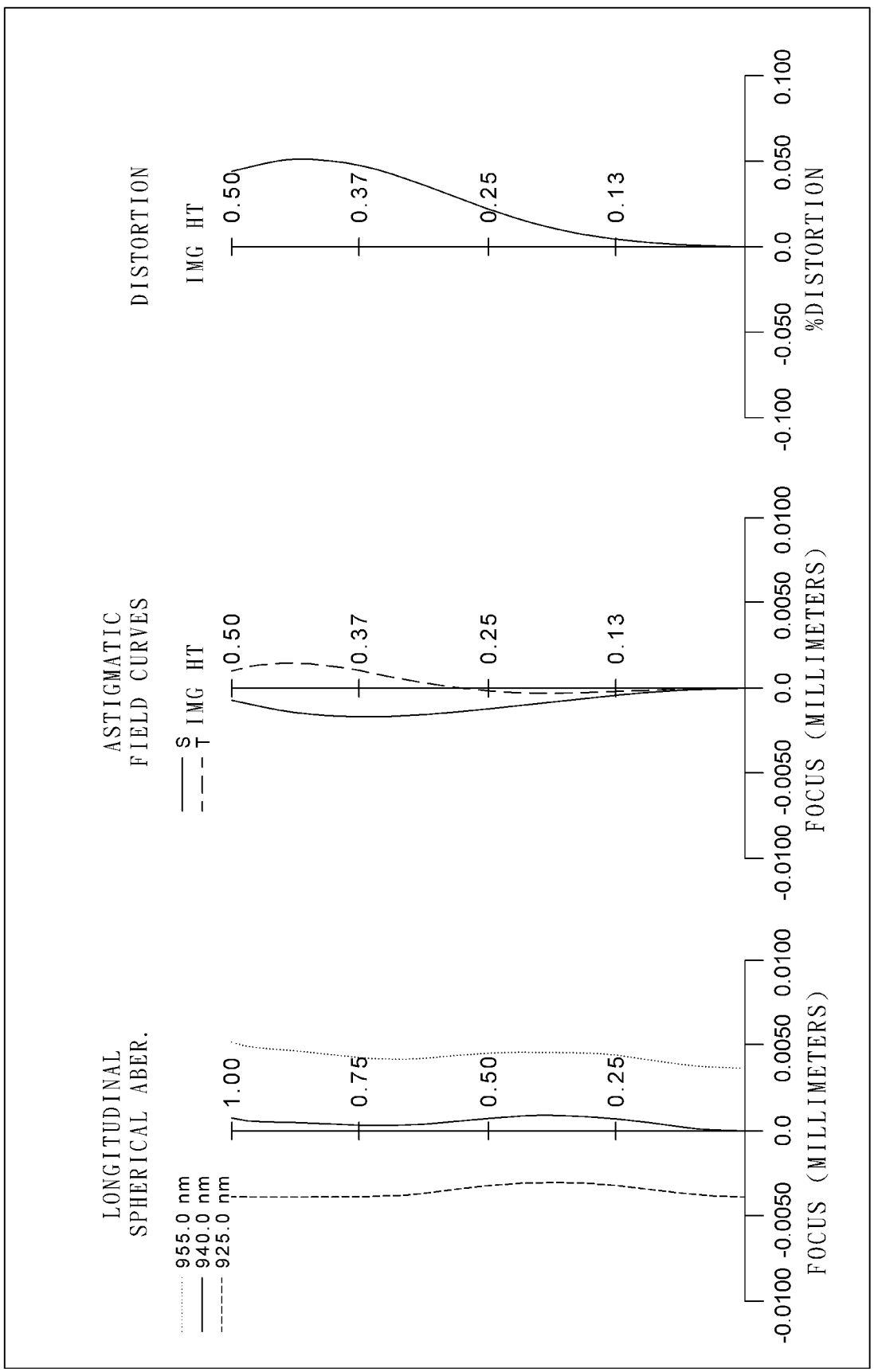
FIG. 5B shows longitudinal spherical aberration curves, astigmatic field curves and a distortion curve of the projection apparatus according to the 5th embodiment.

FIG. 5A is a schematic view of a projection apparatus according to the 5th embodiment of the present disclosure. FIG. 5B shows, in order from left to right, longitudinal spherical aberration curves, astigmatic field curves and a distortion curve of the projection apparatus according to the 5th embodiment.

In FIG. 5A, the projection apparatus includes a lens system (not otherwise herein labeled) of the present disclosure and a light source 545. The lens system includes, in order from an outer side to an inner side, an aperture stop 500, a first lens element 510, a second lens element 520, and a third lens element 530. There is an air gap between each of adjacent lens elements.

The first lens element 510 with positive refractive power has an outer-side surface 511 being convex in a paraxial region thereof, and an inner-side surface 512 being convex in a paraxial region thereof. Both the outer-side surface 511 and the inner-side surface 512 are aspheric, and there are two inflection points on the inner-side surface 512 thereof. The first lens element 510 is made of plastic material.

The second lens element 520 with negative refractive power has an outer-side surface 521 being convex in a paraxial region thereof, and an inner-side surface 522 being concave in a paraxial region thereof. Both the outer-side surface 521 and the inner-side surface 522 are aspheric, and there is one inflection point on the outer-side surface 521 thereof. The second lens element 520 is made of plastic material.

The third lens element 530 with positive refractive power has an outer-side surface 531 being concave in a paraxial region thereof, and an inner-side surface 532 being convex in a paraxial region thereof. Both the outer-side surface 531 and the inner-side surface 532 are aspheric. The third lens element 530 is made of plastic material.

The light source 545 included in the projection apparatus is disposed on an inner-side conjugate surface 540 of the lens system.

The detailed optical data of the 5th embodiment are shown in TABLE 9, and the aspheric surface data are shown in TABLE 10.

TABLE 9

(5th Embodiment)
f = 3.49 mm, Fno = 2.63, HFOV = 8.1 deg.

| Surface # | | Curvature Radius | Thickness | Material | Index | Abbe # | Focal Length |
|---|---|---|---|---|---|---|---|
| 0 | Object | Planar | 400.000 | | | | |
| 1 | Ape. Stop | Planar | −0.226 | | | | |
| 2 | Lens 1 | 1.052 ASP | 1.100 | Plastic | 1.641 | 19.4 | 1.62 |
| 3 | | −45.249 ASP | 0.030 | | | | |
| 4 | Lens 2 | 1.052 ASP | 0.255 | Plastic | 1.641 | 19.4 | −1.18 |
| 5 | | 0.398 ASP | 0.949 | | | | |
| 6 | Lens 3 | −2.826 ASP | 0.666 | Plastic | 1.641 | 19.4 | 1.84 |
| 7 | | −0.909 ASP | 0.200 | | | | |
| 8 | Light Source | Planar | — | | | | |

* Reference wavelength is 940.0 nm.

TABLE 10

Aspheric Coefficient

| Surface # | 2 | 3 | 4 | 5 | 6 | 7 |
|---|---|---|---|---|---|---|
| k = | −5.1710E−01 | −9.9000E+01 | 2.6576E+00 | −2.5492E−01 | 7.8147E+00 | −5.2560E−01 |
| A4 = | 4.0589E−02 | 1.7467E−01 | −1.1084E+00 | −1.6941E+00 | −1.5488E−01 | −8.4249E−02 |
| A6 = | 3.1040E−02 | −5.9680E−01 | −8.1632E−01 | −1.2505E+00 | −3.3582E−01 | −1.3833E−01 |
| A8 = | | −2.4896E+00 | −9.8414E+00 | −2.1087E+01 | | −8.5337E−02 |
| A10 = | | 7.0244E+00 | 1.4417E+01 | | | |

In the 5th embodiment, the equation of the aspheric surface profiles of the aforementioned lens elements is the same as the equation of the 1st embodiment. Also, the definitions of these parameters shown in table below are the same as those stated in the 1st embodiment with corresponding values for the 5th embodiment, so an explanation in this regard will not be provided again.

Moreover, these parameters can be calculated from TABLE 9 and TABLE 10 and satisfy the conditions stated in table below.

| 5th Embodiment | | | |
|---|---|---|---|
| f [mm] | 3.49 | (R1 + R6)/(R1 − R6) | 0.07 |
| Fno. | 2.63 | f/f3 | 1.90 |
| HFOV [deg.] | 8.1 | \|f/f2\| + \|f/f3\| | 4.85 |
| Vdmin | 19.4 | \|f/f1\| + \|f/f2\| + \|f/f3\| | 7.01 |
| Nmax | 1.641 | CT1 + CT2 + CT3 [mm] | 2.02 |
| T12/CT1 | 0.03 | Ymax [mm] | 0.66 |
| T12/T23 | 0.03 | Yc21/CT2 | — |
| (R1 + R2)/(R1 − R2) | −0.95 | Y11/Y32 | 1.16 |
| (R3 + R4)/(R3 − R4) | 2.22 | TL/f | 0.92 |
| (R5 + R6)/(R5 − R6) | 1.95 | BL/TD | 0.07 |

6th Embodiment

Figure 6A:
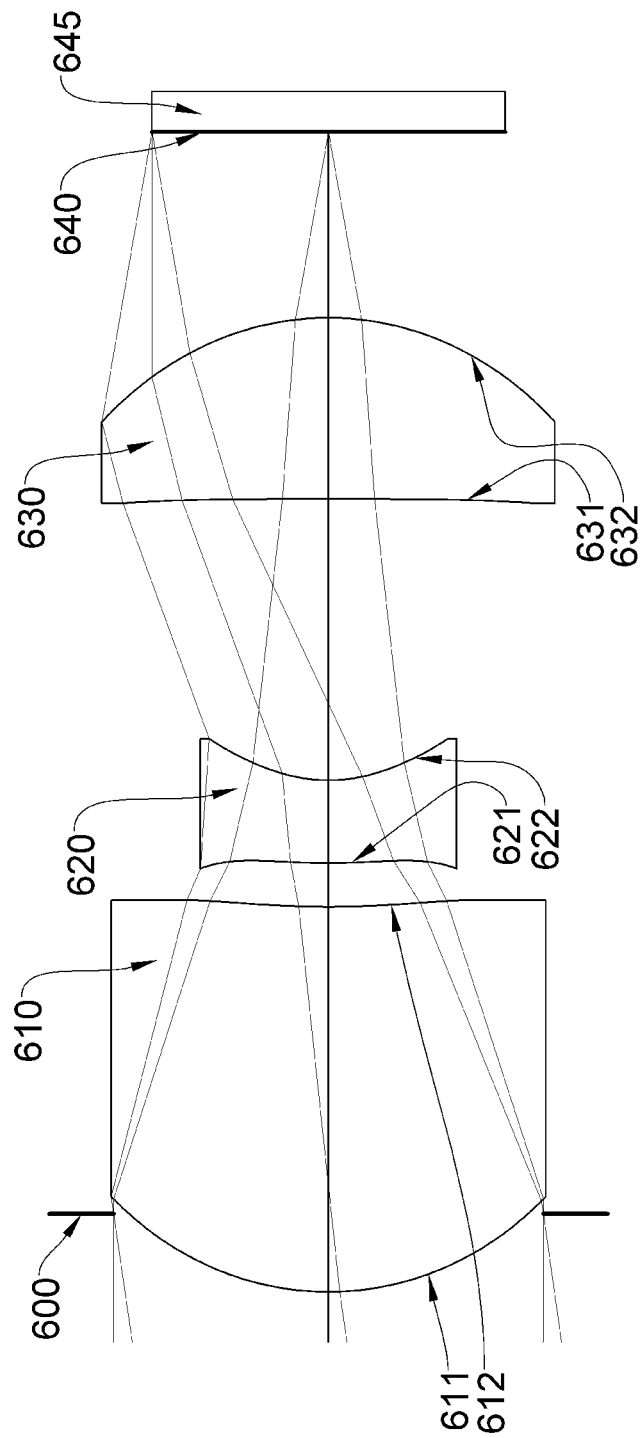
FIG. 6A is a schematic view of a projection apparatus according to the 6th embodiment of the present disclosure.
Figure 6B:
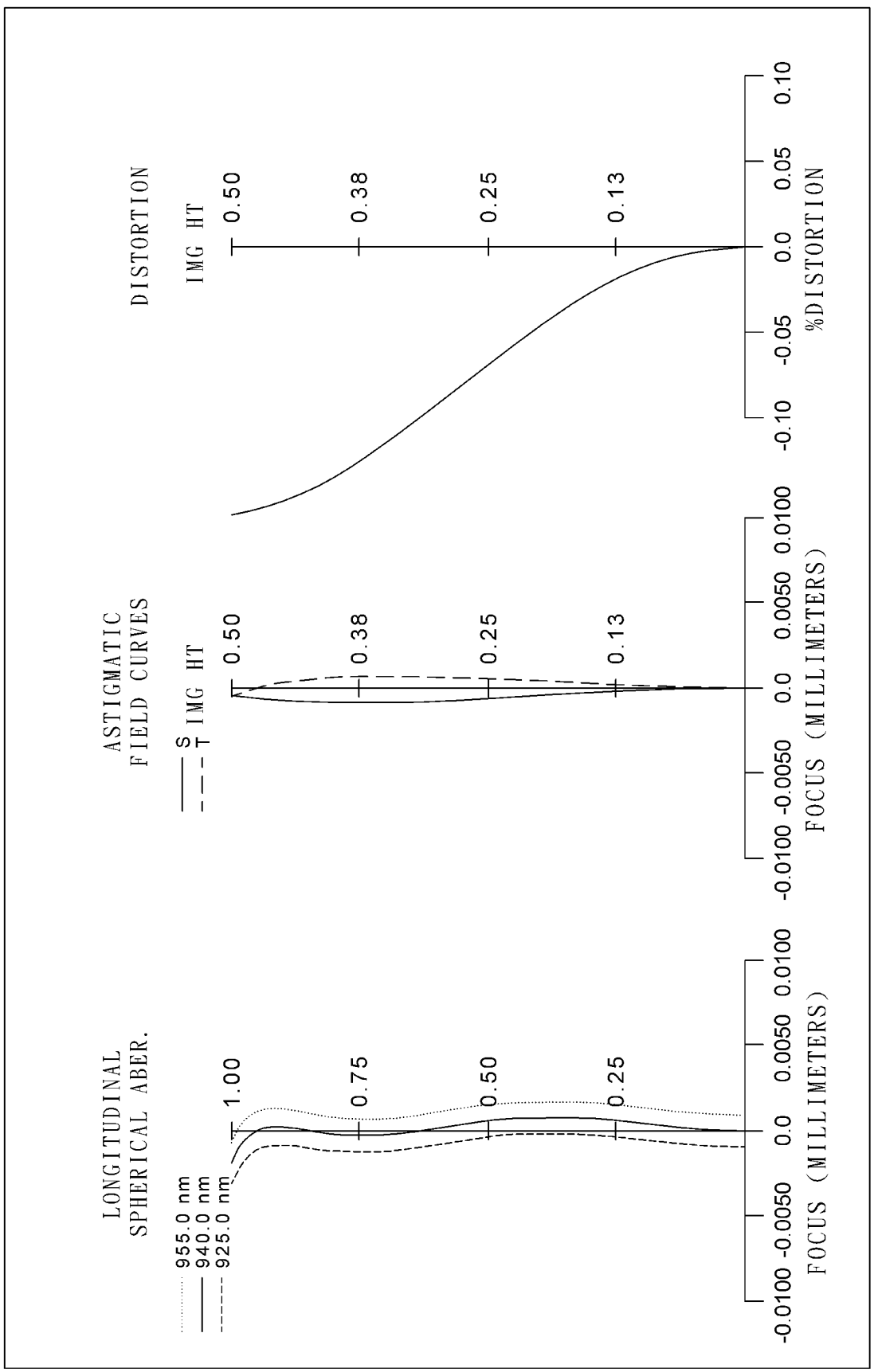
FIG. 6B shows longitudinal spherical aberration curves, astigmatic field curves and a distortion curve of the projection apparatus according to the 6th embodiment.

FIG. 6A is a schematic view of a projection apparatus according to the 6th embodiment of the present disclosure. FIG. 6B shows, in order from left to right, longitudinal spherical aberration curves, astigmatic field curves and a distortion curve of the projection apparatus according to the 6th embodiment.

In FIG. 6A, the projection apparatus includes a lens system (not otherwise herein labeled) of the present disclosure and a light source 645. The lens system includes, in order from an outer side to an inner side, an aperture stop 600, a first lens element 610, a second lens element 620, and a third lens element 630. There is an air gap between each of adjacent lens elements.

The first lens element 610 with positive refractive power has an outer-side surface 611 being convex in a paraxial region thereof, and an inner-side surface 612 being concave in a paraxial region thereof. Both the outer-side surface 611 and the inner-side surface 612 are aspheric, and there is one inflection point on the inner-side surface 612 thereof. The first lens element 610 is made of plastic material.

The second lens element 620 with negative refractive power has an outer-side surface 621 being convex in a paraxial region thereof, and an inner-side surface 622 being concave in a paraxial region thereof. Both the outer-side surface 621 and the inner-side surface 622 are aspheric, and there are one inflection point and one critical point on the outer-side surface 621 thereof. The second lens element 620 is made of plastic material.

The third lens element 630 with positive refractive power has an outer-side surface 631 being concave in a paraxial region thereof, and an inner-side surface 632 being convex in a paraxial region thereof. Both the outer-side surface 631 and the inner-side surface 632 are aspheric. The third lens element 630 is made of plastic material.

The light source 645 included in the projection apparatus is disposed on an inner-side conjugate surface 640 of the lens system.

The detailed optical data of the 6th embodiment are shown in TABLE 11, and the aspheric surface data are shown in TABLE 12.

TABLE 11

(6th Embodiment)
f = 3.50 mm, Fno = 2.87, HFOV = 8.1 deg.

| Surface # | | Curvature Radius | Thickness | Material | Index | Abbe # | Focal Length |
|---|---|---|---|---|---|---|---|
| 0 | Object | Planar | 400.000 | | | | |
| 1 | Ape. Stop | Planar | −0.221 | | | | |
| 2 | Lens 1 | 0.815 ASP | 1.092 | Plastic | 1.536 | 56.1 | 1.84 |
| 3 | | 2.516 ASP | 0.124 | | | | |
| 4 | Lens 2 | 1.682 ASP | 0.235 | Plastic | 1.617 | 23.5 | −1.00 |
| 5 | | 0.428 ASP | 0.798 | | | | |
| 6 | Lens 3 | −42.822 ASP | 0.514 | Plastic | 1.535 | 56.0 | 1.53 |
| 7 | | −0.807 ASP | 0.527 | | | | |
| 8 | Light Source | Planar | — | | | | |

* Reference wavelength is 940.0 nm.

TABLE 12

Aspheric Coefficient

| Surface # | 2 | 3 | 4 | 5 | 6 | 7 |
|---|---|---|---|---|---|---|
| k = | −1.6648E−01 | 0.0000E+00 | 0.0000E+00 | −1.0793E+00 | 0.0000E+00 | −1.6340E−01 |
| A4 = | 1.7586E−03 | −4.9728E−01 | −3.2199E+00 | −1.9043E+00 | −5.0898E−02 | 3.1770E−02 |
| A6 = | 1.0849E−02 | 1.3688E+00 | 2.1591E+00 | 7.2378E+00 | −5.7403E−02 | 1.9628E−02 |
| A8 = | | −1.0073E+01 | −1.4118E+01 | | | 1.8346E−02 |

In the 6th embodiment, the equation of the aspheric surface profiles of the aforementioned lens elements is the same as the equation of the 1st embodiment. Also, the definitions of these parameters shown in table below are the same as those stated in the 1st embodiment with corresponding values for the 6th embodiment, so an explanation in this regard will not be provided again.

Moreover, these parameters can be calculated from TABLE 11 and TABLE 12 and satisfy the conditions stated in table below.

| 6th Embodiment | | | |
|---|---|---|---|
| f [mm] | 3.50 | (R1 + R6)/(R1 − R6) | 0.01 |
| Fno. | 2.87 | f/f3 | 2.29 |
| HFOV [deg.] | 8.1 | \|f/f2\| + \|f/f3\| | 5.78 |
| Vdmin | 23.5 | \|f/f1\| + \|f/f2\| + \|f/f3\| | 7.68 |
| Nmax | 1.617 | CT1 + CT2 + CT3 [mm] | 1.84 |
| T12/CT1 | 0.11 | Ymax [mm] | 0.64 |
| T12/T23 | 0.16 | Yc21/CT2 | 0.94 |
| (R1 + R2)/(R1 − R2) | −1.96 | Y11/Y32 | 0.96 |
| (R3 + R4)/(R3 − R4) | 1.68 | TL/f | 0.94 |
| (R5 + R6)/(R5 − R6) | 1.04 | BL/TD | 0.19 |

7th Embodiment

Figure 9A:
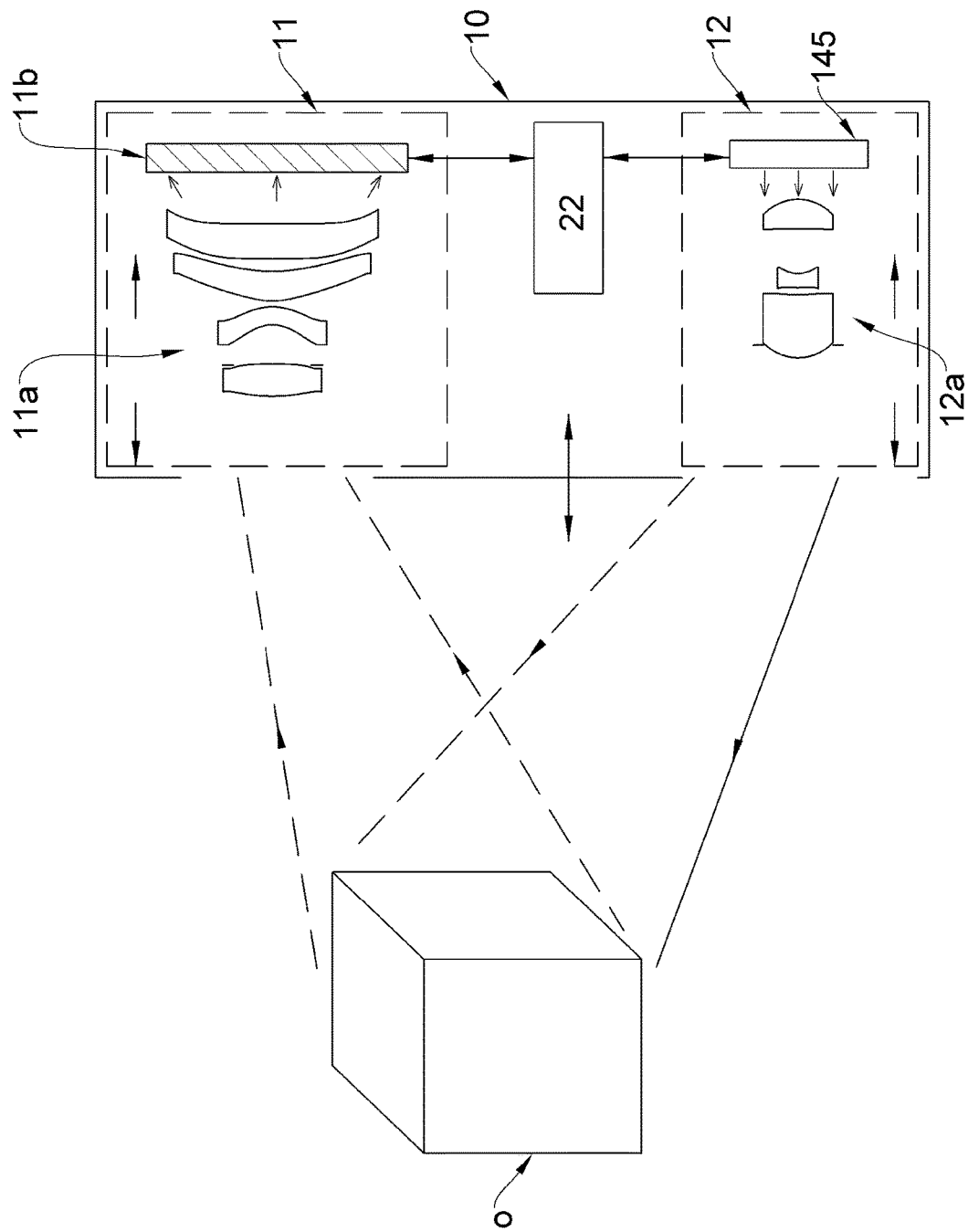
FIG. 9A is a schematic view of a detecting module according to the 7th embodiment of the present disclosure.

Please refer to FIG. 9A. FIG. 9A is a schematic view of a detecting module according to the 7th embodiment of the present disclosure. In the present embodiment, the detecting module 10 includes a receiving apparatus 11 and the projection apparatus 12 disclosed in the 1st embodiment aforementioned. The receiving apparatus 11 includes an imaging lens system 11a and an image sensor 11b.

The projection apparatus 12 includes a lens system 12a and a light source 145 with high directional (low divergence) and high intensity. The light source 145 can be a laser, superluminescent diode (SLED), micro LED, resonant-cavity LED (RCLED), vertical-cavity surface-emitting laser (VCSEL) light source or the likes. The light source can be a single light source or multiple light sources disposed on the inner-side conjugate surface 140 of the lens system 12a to faithfully realize projections with high quality. When the light source 145 of the projection apparatus 12 is a vertical-cavity surface-emitting laser light source and is disposed on the inner-side conjugate surface 140 of the lens system 12a, the projection apparatus 12 can be provided with a highly directional, low divergence and high intensity light source from such suitable arrangement of light such that the illuminance on an outer-side conjugate surface of the lens system 12a can be increased. The light source 145 of the projection apparatus can project light onto a detected object O. The light reflected by the detected object O incidents into the receiving apparatus 11 and forms an image on the image sensor 11b through the imaging lens system 11a.

Figure 9B:
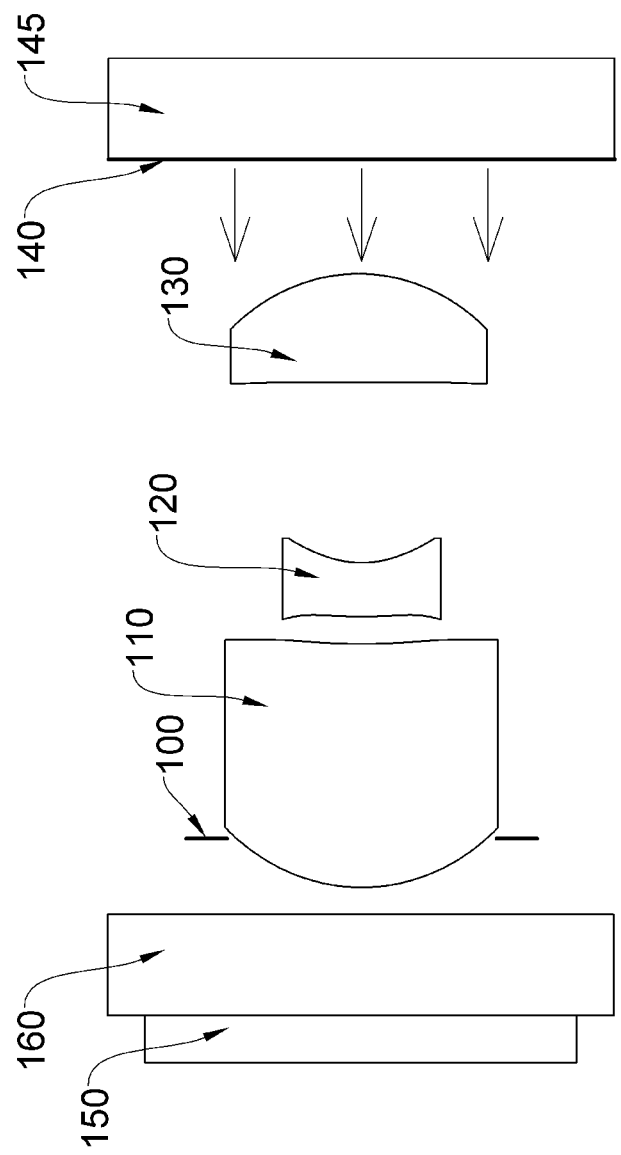
FIG. 9B is another example of a projection apparatus of the detecting module according to the 7th embodiment of the present disclosure.

FIG. 9B is another example of a projection apparatus of the detecting module according to the 7th embodiment of the present disclosure. The projection apparatus includes a diffusing element 150 and a cover glass 160 in order in front of the aperture stop 100 thereof and the diffusing element 150 is disposed at a side close to the detected object. The diffusing element 150 can be made of silicon dioxide material. Both the diffusing element 150 and the cover glass 160 will not affect the focal length of the lens system. The detecting module in the present disclosure equipped with the diffusing element can favorably allow the light to project evenly onto the detected object O or to diffract while increasing the projection angle and the light-projected area. The diffusing element can be a diffuser, a raster or a combination thereof (but not limited) and the surface of the diffusing element can have a micro structure (such as grating) to diffuse the light and duplicate the speckle pattern resulted therefrom so as to enlarge the projection angle of the projection apparatus 12.

The detecting module of the present disclosure is not limited to the example shown in FIG. 9A and may further include a component or a lens assembly with an adjustable focus depending on the needs. With the adjustable focus component equipped therein, the focal length of the lens system 12a of the projection apparatus 12 or the focal length of the imaging lens system 11a of the receiving apparatus 11 can be adjusted for different environmental factors so as to make the image clear. With a lens assembly having reflection functionality, the size of the detecting module can be reduced and the space configuration can be more flexible.

Any of the lens system from the 2nd embodiment to the 6th embodiment in the present disclosure can all be used in the projection apparatus of the detecting module in the present disclosure. On the other hand, the lens systems from the 1st embodiment to the 6th embodiment can also be used in the imaging system. When the lens system of the present disclosure is used in the imaging system, people of ordinary skills in the art should be capable to understand that the inner-side conjugate surface of the lens system in the present disclosure is the image surface of the imaging system and the image sensor is disposed on the image surface.

8th Embodiment

Figure 10A:
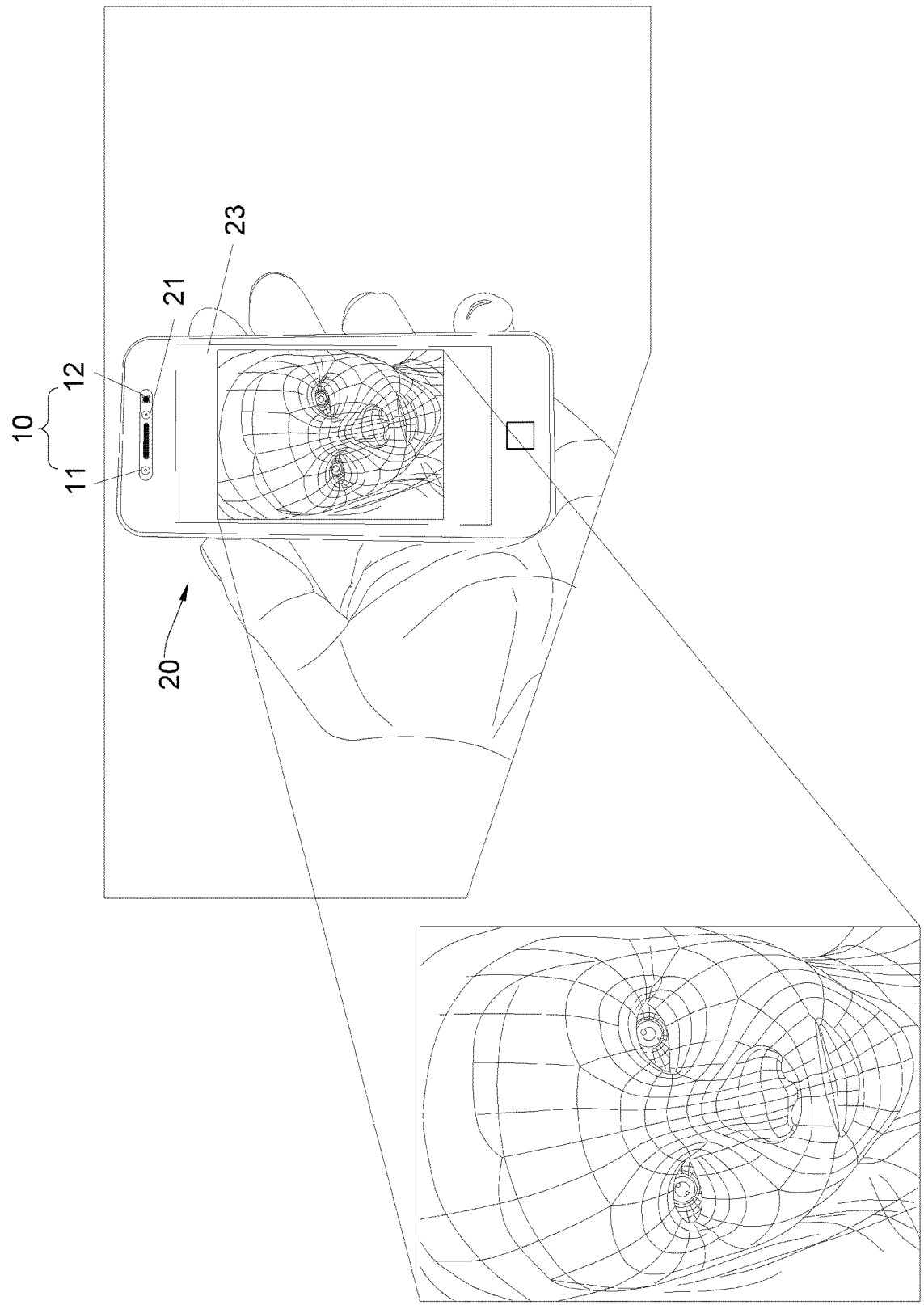
FIG. 10A is a front schematic view of an electronic device according to the 8th embodiment of the present disclosure.
Figure 10B:
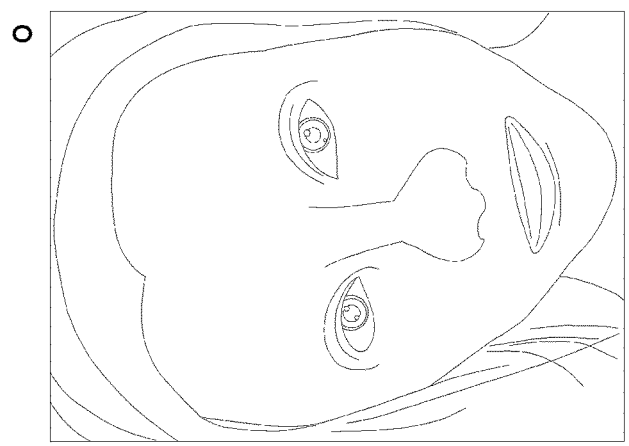
FIG. 10B is a schematic view of an electronic device according to the 8th embodiment of the present disclosure, sensing three-dimensional shape change on a human face surface.
Figure 10B:
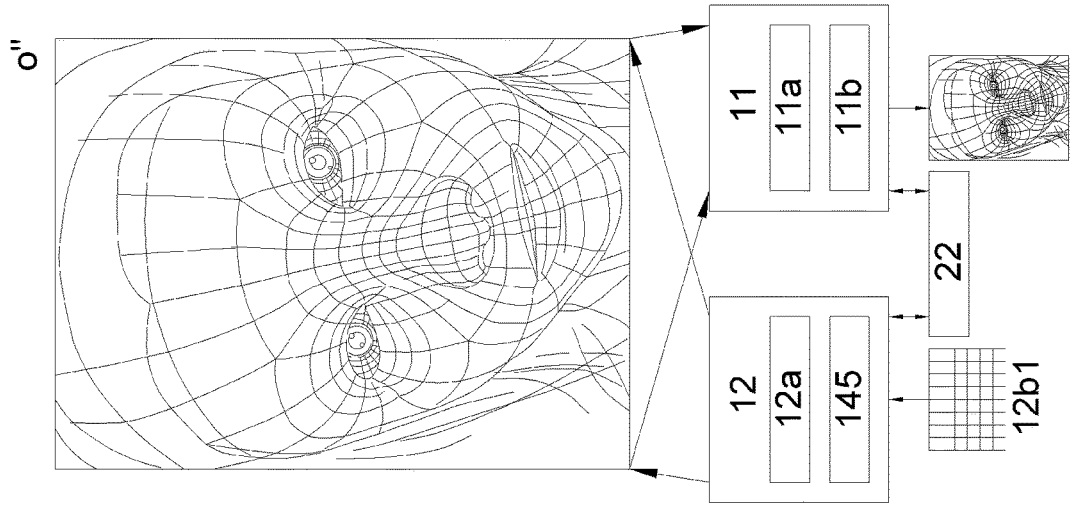

Please refer to FIGS. 10A and 10B. FIG. 10A is a front schematic view of an electronic device according to the 8th embodiment of the present disclosure. FIG. 10B is a schematic view of sensing the change of the three-dimensional shape on a human face surface by using the electronic device described in FIG. 10A. In the present embodiment, the electronic device 20 is a smartphone, which includes an imaging device 21, an image signal processor 22, the detecting module 10 of the 7th embodiment, and a display device 23. The imaging device 21 can include an optical lens currently available for video or photo shooting.

The detecting module 10A uses a laser matric 12b1 as the light source 145 of the projection apparatus 12 thereof so as to generate light with specific patterns. The light from the light source passes through the lens system 12a of the projection apparatus 12 and forms a structured light. The structured light further projects onto the human face surface (that is, detected object O). The structured light can be a dot shaped, spot shaped or stripe shaped structure but not limited. The structured light projected onto the human face surface further forms a corresponding 3-dimensional structure of the human face surface O".

The detecting module 10 can receive the light reflected by the human face surface (3-dimensional structure of the human face surface O") by the imaging lens system 11a of the receiving apparatus 11 and further receive the light by the image sensor 11b to capture images. After analyses and calculations of the captured images by the image signal processor 22, relative distances between each portion of the human surface can be obtained. Furthermore, after the captured images being analyzed and calculated by the image signal processor 22, the electronic device 20 can render the analyzed and calculated human face images on the display device 23.

Figure 11A:
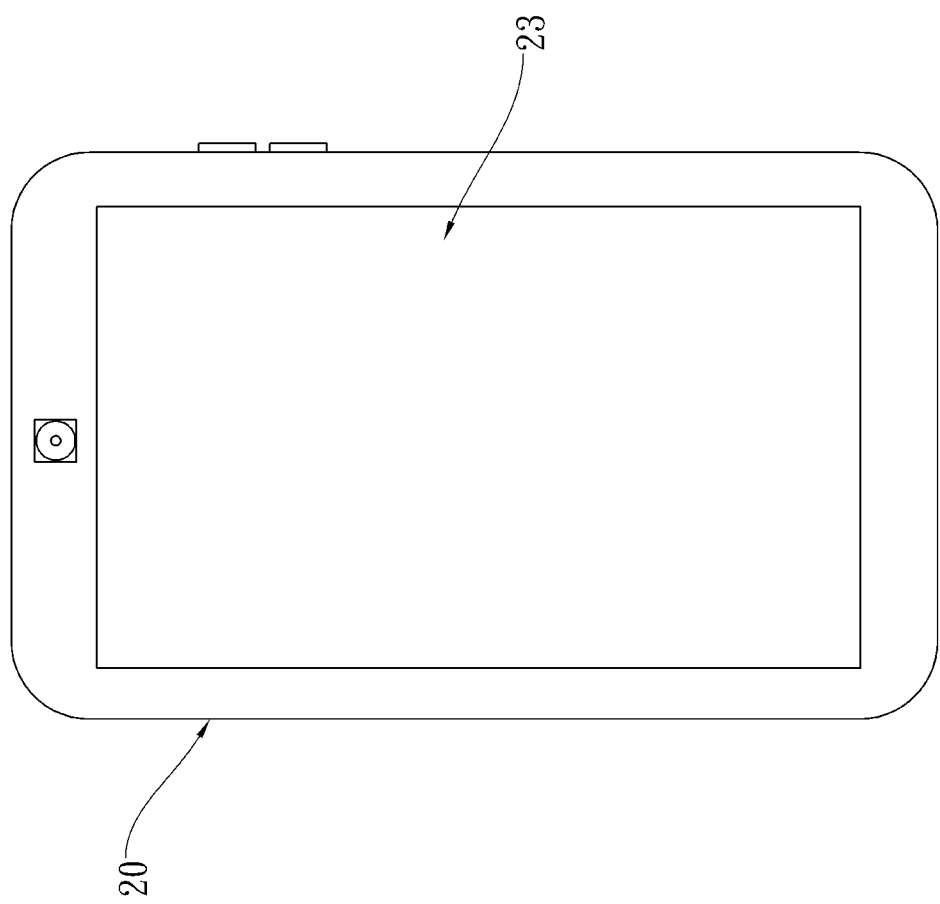
FIG. 11A is a front view of an electronic device according to another embodiment of the present disclosure.

In FIG. 10A, the detecting module 10, imaging device 21 and display device 23 are disposed at the same side of the electronic device 20, but not limited. FIG. 11A and FIG. 11B are front view and rear view of an electronic device according to another embodiment capable of sensing the change of the three-dimensional shape on a human face. According to the needs, the receiving apparatus 11, the projection apparatus and the imaging device 21 are disposed at one side of the electronic device while the display device 23 is disposed on the opposite side of the electronic device 20.

The projection apparatus of the present disclosure is not limited to be applied to the smartphone. The projection apparatus may be used in a system of moving focus and features in both excellent aberration correction and satisfactory image quality according to the needs. For example, the projection apparatus may be applied to a variety of applications such as 3-dimensional (3D) image capturing, digital cameras, portable devices, tablet computers, smart televisions, internet surveillance apparatuses, driving recorders, rear view devices, multi-lens devices, identification systems, somatosensory detections, wearable devices and other electronic devices. The aforementioned electronic apparatus is merely exemplary of practical use of the present disclosure and does not limit the scope of application of the projection apparatus of the present disclosure.

It is to be noted that aforementioned tables show different data of the different lens system in the embodiments of the present disclosure; however, the data of the different embodiments are obtained from experiments. The embodiments were chosen and described in order to best explain the principles of the disclosure and its practical applications, and thereby to enable others skilled in the art to best utilize the disclosure and various embodiments with various modifications as are suited to the particular use contemplated. The embodiments depicted above and the appended drawings are exemplary and are not intended to be exhaustive or to limit the scope of the present disclosure to the precise forms disclosed. Many modifications and variations are possible in view of the above teachings.

What is claimed is:

1. An electronic device comprising a projection apparatus, the projection apparatus comprising a lens system and at least one light source, the lens system comprising three lens elements, which are, in order from an outer side to an inner side: a first lens element, a second lens element and a third lens element, wherein an outer-side surface of the second lens element is convex in paraxial region thereof, the third lens element with positive refractive power has an inner-side surface being convex in a paraxial region thereof, an absolute value of a curvature radius of an inner-side surface of the second lens element is a minimum among absolute values of surface curvature radii of the three lens elements, an aperture stop is located on an outer side of the first lens element, a central thickness of the second lens element is larger than an axial distance between the first lens element and the second lens element, a minimum among Abbe numbers of the three lens elements is Vdmin, a maximum among refractive indices of the three lens elements is Nmax, a maximum among maximum effective radii on outer-side surfaces and inner-side surfaces of the three lens elements is Ymax, and the following conditions are satisfied:

$$5.0 < Vd\min \leq 20.4;$$

$$1.50 < N\max < 1.73;$$

and $$0.1 \text{ mm} < Y\max < 1.0 \text{ mm}.$$

2. The electronic device of claim 1, wherein a focal length of the lens system is f, a focal length of the third lens element is f3, and the following condition is satisfied:

$$-0.50 < f/f3 \leq 2.33.$$

3. The electronic device of claim 1, wherein a curvature radius of an outer-side surface of the first lens element is R1, a curvature radius of the inner-side surface of the third lens element is R6, and the following condition is satisfied:

$$-0.20 < (R1+R6)/(R1-R6) < 0.20.$$

4. The electronic device of claim 1, wherein a curvature radius of an outer-side surface of the third lens element is R5, a curvature radius of the inner-side surface of the third lens element is R6, and the following condition is satisfied:

$$0.70 < (R5+R6)/(R5-R6) < 2.20.$$

5. The electronic device of claim 1, wherein a central thickness of the first lens element is CT1, the central thickness of the second lens element is CT2, a central thickness of the third lens element is CT3, the maximum among refractive indices of the three lens elements is Nmax, and the following conditions are satisfied:

$$1.86 \text{ mm} \leq CT1+CT2+CT3 < 2.50 \text{ mm};$$

$$1.50 < N\max \leq 1.641.$$

6. The electronic device of claim 1, wherein the minimum among Abbe numbers of the three lens elements is Vdmin, and the following condition is satisfied:

$$10.0 < Vd\min < 20.0.$$

7. The electronic device of claim 1, wherein the lens system is applied to an infrared wavelength range from 750 nm to 1600 nm.

8. The electronic device of claim 1, where the at least one light source is a vertical-cavity surface-emitting laser (VC-SEL) light source.

9. The electronic device of claim 1, wherein the first lens element has positive refractive power and has an outer-side surface being convex in a paraxial region thereof and an inner-side surface being concave in a paraxial region thereof, the second lens element has an inner-side surface being concave in a paraxial region thereof, there is an air gap between each of adjacent lens elements of the lens system.

10. The electronic device of claim 1, wherein a focal length of the first lens element is f1, a focal length of the second lens element is f2, and the following condition is satisfied:

$$|f2| < |f1|.$$

11. The electronic device of claim 1, wherein a maximum effective radius on an outer-side surface of the first lens element is Y11, a maximum effective radius on the inner-side surface of the third lens element is Y32, and the following condition is satisfied:

$$0.85 < Y11/Y32 < 1.50.$$

12. The electronic device of claim 1, wherein an axial distance between the inner-side surface of the third lens element and an inner-side conjugate surface of the lens system is BL, an axial distance between an outer-side surface of the first lens element and the inner-side surface of the third lens element is TD, and the following condition is satisfied:

$$0 < BL/TD < 0.50.$$

13. The electronic device of claim 1, wherein at least one lens surface of the three lens elements has at least one inflection point.

14. The electronic device of claim 1, wherein the projection apparatus comprises at least one diffractive element located on an outer side of the first lens element.

15. The electronic device of claim 1, wherein the maximum among refractive indices of the three lens elements is Nmax, and the following condition is satisfied:

$$1.50 < N\max < 1.70.$$

16. The electronic device of claim 1, wherein the axial distance between the first lens element and the second lens element is T12, an axial distance between the second lens element and the third lens element is T23, and the following condition is satisfied:

$$0.01 < T12/T23 < 0.70.$$

* * * * *